(12) United States Patent
Thomas et al.

(10) Patent No.: US 9,511,362 B2
(45) Date of Patent: Dec. 6, 2016

(54) ANION-CONDUCTING POLYMER

(71) Applicant: Simon Fraser University, Burnaby (CA)

(72) Inventors: Owen Thomas, Vancouver (CA); Steven Holdcroft, Pitt Meadows (CA); Andrew Wright, Burnaby (CA)

(73) Assignee: Simon Fraser University, Burnaby, CA (US)

( * ) Notice: Subject to any disclaimer, the term of this patent is extended or adjusted under 35 U.S.C. 154(b) by 0 days.

(21) Appl. No.: 15/068,361

(22) Filed: Mar. 11, 2016

(65) Prior Publication Data

US 2016/0193599 A1 Jul. 7, 2016

Related U.S. Application Data

(62) Division of application No. 14/385,115, filed as application No. PCT/CA2013/000323 on Apr. 4, 2013, now Pat. No. 9,315,630.

(60) Provisional application No. 61/620,074, filed on Apr. 4, 2012.

(51) Int. Cl.
*C08L 77/00* (2006.01)
*B01J 41/12* (2006.01)
*C08G 73/18* (2006.01)
*C08J 5/22* (2006.01)
*B01D 71/62* (2006.01)
*B01J 41/14* (2006.01)
*C08F 112/12* (2006.01)

(52) U.S. Cl.
CPC ............. *B01J 41/125* (2013.01); *B01D 71/62* (2013.01); *B01J 41/14* (2013.01); *C08F 112/12* (2013.01); *C08G 73/18* (2013.01); *C08J 5/2243* (2013.01); *C08J 5/2256* (2013.01); *C08J 2325/16* (2013.01); *C08J 2379/04* (2013.01)

(58) Field of Classification Search
CPC .............................. C08G 73/18; C08J 2379/04
USPC ......................................................... 525/432
See application file for complete search history.

(56) References Cited

FOREIGN PATENT DOCUMENTS

JP 2009-087687 A 4/2009
JP 2012-128142 A 7/2012

OTHER PUBLICATIONS

International Search Report and Written Opinion mailed Jul. 16, 2013, issued in corresponding International Application No. PCT/CA2013/000323, filed Apr. 4, 2013, 7 pages.
Pu, H., et al., "Synthesis and Characterization of Fluorine-Containing Polybenzimidazole for Proton Conducting Membranes in Fuel Cells," Journal of Polymer Science: Part A: Polymer Chemistry 48(10):2115-2122, May 2010.
Takagi, K., et al., "Synthesis of Imidazole-Containing Conjugated Polymers Bearing Phenol Unit as Side Group and Excited State Intramolecular Proton Transfer-Mediated Fluorescence," Journal of Polymer Science: Part A: Polymer Chemistry 47(18):4822-4829, Sep. 2009.

*Primary Examiner* — Shane Fang
(74) *Attorney, Agent, or Firm* — Christensen O'Connor Johnson & Kindness PLLC

(57) ABSTRACT

Disclosed herein are anion-conducting polymers that comprise a cationic benzimidazolium and imidazolium moieties. Methods of forming the polymers and membranes comprising the polymers are also provided.

15 Claims, 30 Drawing Sheets

R₁= methyl, ethyl, i-propyl, t-butyl, methoxy, trifluoromethyl, phenyl, 2,6-xylyl, bromo
R₂= H, Methyl, Any Group

2-X⁻

R₁ = methyl, ethyl, i-propyl, t-butyl, methoxy, trifluoromethyl, phenyl, 2,6-xylyl, bromo
R₂ = H, Methyl, Any Group

2-X⁻

3-X⁻

Method 2 (Benzimidazole):

Method 2 (Imidazole):

ANION-CONDUCTING POLYMER

CROSS-REFERENCES TO RELATED APPLICATIONS

This application is a division of U.S. patent application Ser. No. 14/385,115, filed Sep. 12, 2014, which is a national stage of International Patent Application No. PCT/CA2013/000323, filed Apr. 4, 2013, which claims the benefit of U.S. Provisional Application No. 61/620,074, filed Apr. 4, 2012, the disclosure of each of which is hereby incorporated by reference in its entirety.

BACKGROUND

Alkali anion exchange membranes are predominantly based on quaternary ammonium groups pendant to a polymer main chain (or "backbone"). The stability of quaternary ammonium groups is often poor in highly alkaline solutions and thus, the performance of these materials has been shown to rapidly degrade over time. There is a need to discover and explore positively charged polymers that offer the potential of improving alkali-stability.

Despite the wealth of literature on positively charged benzimidazolium species (including an abundance of literature on ionic liquids), polybenzimidazolium analogs remain relatively unexplored for ion-exchange materials. Notably, it has been reported that anion exchange materials can indeed be obtained by methylation of poly(benzimidazole) (PBI) and the resulting iodide ion exchanged for an anion of choice. However, the hydroxide form of this polymer is unstable. Therefore, a viable ion-exchange material formed from benzimidazolium or analogous materials has not yet been developed.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In one aspect, a polymer is provided. The polymer comprises one or more repeating units. In one embodiment, at least one of the repeating units comprises one or more benzimidazolium-containing moieties having Formula (I):

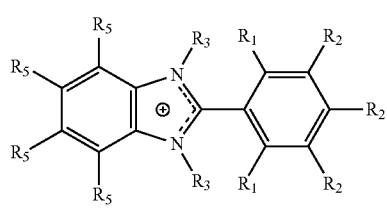

Formula (I)

wherein:
$R_1$=methyl, trifluoromethyl, alkyl, perfluoroalkyl, heteroalkyl, alkoxy, perfluoroalkoxy, halo, aryl, heteroaryl group, or polymer, where $R_1$ are the same or different;
$R_2$=hydrogen, any group, or a polymer, where $R_2$ are the same or different;
$R_3$=methyl, trifluoromethyl, alkyl, perfluoroalkyl, heteroalkyl, aryl, aralkyl, a polymer, or no group, where $R_3$ are the same or different; and
$R_5$=hydrogen, any group, or a polymer, where $R_5$ are the same or different.

Wherein at least one of $R_1$, $R_2$, $R_3$, and $R_5$, is a polymer. At each instance, every R-group is independently selected.

In another aspect, another polymer is provided. The polymer comprises one or more repeating units. In one embodiment, at least one of the repeating units comprises one or more imidazolium-containing moieties having Formula (II):

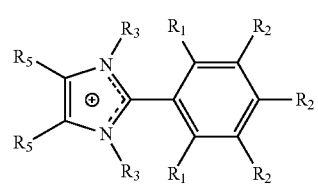

Formula (II)

wherein:
$R_1$=methyl, trifluoromethyl, alkyl, perfluoroalkyl, heteroalkyl, alkoxy, perfluoroalkoxy, halo, aryl, heteroaryl group, or polymer, where $R_1$ are the same or different;
$R_2$=hydrogen, any group, or a polymer, where $R_2$ are the same or different;
$R_3$=methyl, trifluoromethyl, alkyl, perfluoroalkyl, heteroalkyl, aryl, aralkyl, a polymer, or no group, where $R_3$ are the same or different; and
$R_5$=hydrogen, any group, or a polymer, where $R_5$ are the same or different.

Wherein at least one of $R_1$, $R_2$, $R_3$, and $R_5$, is a polymer. At each instance, every R-group is independently selected.

In another aspect, an ionic membrane is provided. In one embodiment, the ionic membrane comprises a cationic polymer incorporating the moiety of any one of the Formulas disclosed herein.

Methods of making the polymers and ionic membranes are also provided.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 1B: Poly(2,2'-(m-mesitylene)-5,5'-bis-(N,N'-dimethylbenz-imidazolium)), referred to herein as "Mes-P (DMBI)" and "(2-X⁻)"; and FIG. 1C: Poly(2,2'-(m-phenylene)-5,5'-bis-(N,N'-dimethylbenzimidazolium)), referred to herein as "P(DMBI)" and "(3-X⁻)."

DETAILED DESCRIPTION

Figure 1A:
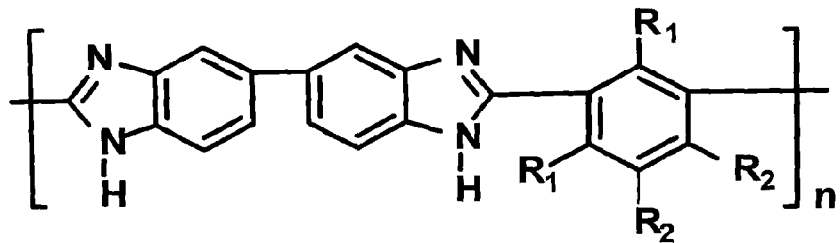
FIG. 1A depicts the general structure of representative polymers according to the disclosed embodiments.
Figure 1B:
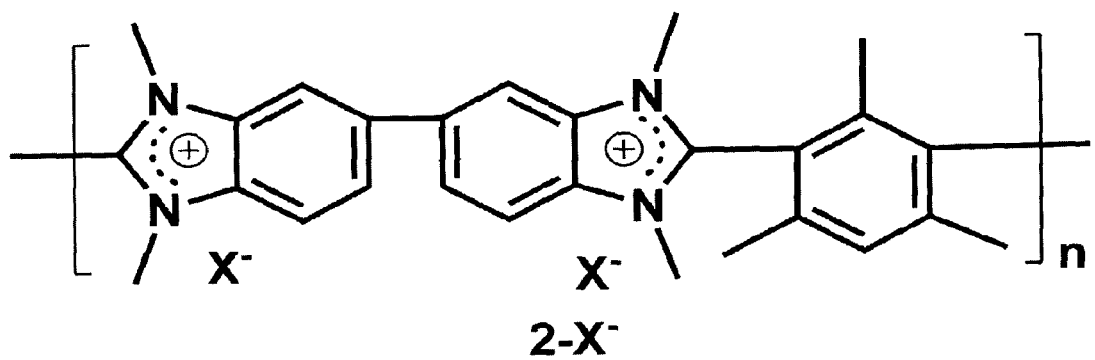
FIGS. 1B and 1C depict structures of exemplary polymers.
Figure 1C:
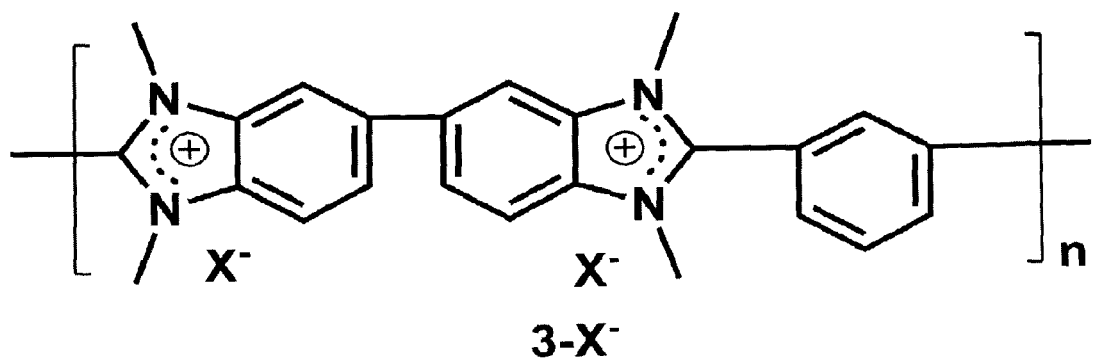

Disclosed herein are anion-conducting polymers that comprise cationic benzimidazolium and imidazolium moieties. Methods of forming the polymers and membranes comprising the polymers are also provided.

Here, we demonstrate that benzimidazolium hydroxide salts and imidazolium hydroxide salts can be stabilized by steric crowding around the benzimidazolium nitrogens, and consequently use this strategy to synthesize novel polymers with greatly enhanced stability to alkaline solutions. Additionally, a new method is provided for preparing insoluble membranes of these water-soluble polymers.

In one aspect, a polymer is provided. The polymer comprises one or more repeating units ("monomer units"). In one embodiment, at least one of the monomer units comprises one or more benzimidazolium-containing moieties ("M1") having Formula (I):

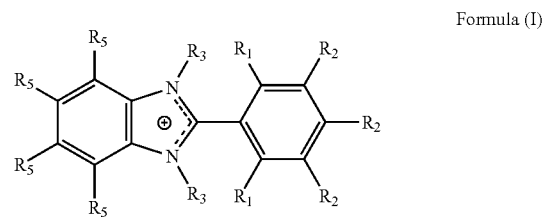

Formula (I)

wherein:

$R_1$=methyl, trifluoromethyl, alkyl, perfluoroalkyl, heteroalkyl, alkoxy, perfluoroalkoxy, halo, aryl, heteroaryl group, or polymer, where $R_1$ are the same or different;

$R_2$=hydrogen, any group, or a polymer, where $R_2$ are the same or different;

$R_3$=methyl, trifluoromethyl, alkyl, perfluoroalkyl, heteroalkyl, aryl, aralkyl, a polymer, or no group, where $R_3$ are the same or different; and $R_5$=hydrogen, any group, or a polymer, where $R_5$ are the same or different.

Wherein at least one of $R_1$, $R_2$, $R_3$, and $R_5$, is a polymer.

These "R-group" definitions are consistent for all Formulas, Figures, and Schemes throughout the disclosure. At each instance, every R-group is independently selected.

In another aspect, another polymer is provided. The polymer comprises one or more repeating units. In one embodiment, at least one of the repeating units comprises one or more imidazolium-containing moieties ("M2") having Formula (II):

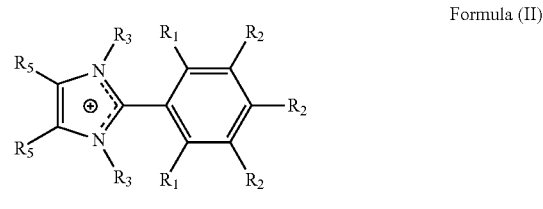

Formula (II)

wherein:

$R_1$=methyl, trifluoromethyl, alkyl, perfluoroalkyl, heteroalkyl, alkoxy, perfluoroalkoxy, halo, aryl, heteroaryl group, or polymer, where $R_1$ are the same or different;

$R_2$=hydrogen, any group, or a polymer, where $R_2$ are the same or different;

$R_3$=methyl, trifluoromethyl, alkyl, perfluoroalkyl, heteroalkyl, aryl, aralkyl, a polymer, or no group, where $R_3$ are the same or different; and $R_5$=hydrogen, any group, or a polymer, where $R_5$ are the same or different.

Wherein at least one of $R_1$, $R_2$, $R_3$, and $R_5$, is a polymer. At each instance, every R-group is independently selected.

As used herein, the term moiety is used to refer to one or both of the moieties of Formulas (I) and (II). Together, they may be referred to as moieties. They may also be referred to as the imidazolium or benzimidazolium moieties.

The steric crowding of the provided moieties results from the interaction of the $R_3$ imidazolium or benzimidazolium groups in relation to relatively "bulky" groups at the $R_1$ positions on the aryl ring. Accordingly, as noted above, the $R_1$ groups are at least as large as a methyl group. The inventors believe that the steric interactions between the $R_1$ and $R_3$ groups alter the geometry of the imidazolium or benzimidazolium-aryl bond such that the $R_1$ groups are situated in close proximity to the position in the imidazolium or benzimidazolium ring most prone to nucleophilic attack by hydroxide.

The moieties M1 and M2 can be incorporated into a polymer in any manner known to those of skill in the art. Particularly, the moieties can be attached to a polymer chain at any of the $R_1$, $R_2$, $R_3$, or $R_5$ positions. As used herein, when an R-group is defined as a "polymer", that R-group location connects one of the moieties to a polymer chain. As discussed further herein, multiple R-groups can be "polymer" and the moieties can be incorporated into a polymer in a number of ways, including as part of the polymer backbone and/or as a pendant.

In one embodiment, the moiety M1 is incorporated in the monomer as part of the polymer backbone, as described in further experimental detail below. As used herein, a monomer that is part of the main chain (or backbone) of a polymer is a repeating unit that is connected on at least two ends to the polymer chain. It will be appreciated that the moiety can be the only moiety in the backbone monomer: $-[M1]_x-$. Alternatively, the moiety can be one of a plurality of moieties in the backbone of the monomer: $[M1]_x[A]_y[B]_z$, As an example of integrating the moiety M1 into the main chain of a polymer, the following exemplary structure of Formula (III) is illustrative:

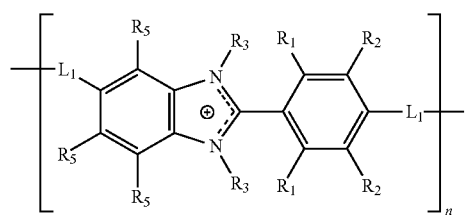

Formula (III)

wherein $L_1$ is an optional addition group or groups on either side of the moiety. $L_1$ can be any group known to those of skill in the art (e.g., alkyl, aryl, etc.).

In one embodiment, the moiety M1 is incorporated as a pendant moiety attached to the backbone of the polymer. As used herein, the term "pendant" refers to a moiety that is attached at only one end to a polymer backbone. It will be appreciated that the moiety may be directly connected to the polymer backbone or there may be additional moieties (e.g., linker groups, $L_2$) in between the moiety and the polymer backbone. Once again, attachment can come at any of the $R_1$, $R_2$, $R_3$, or $R_5$ positions.

For example, attachment can be through an $R_2$ position on the aryl, as illustrated in Formula (IV) below. $L_2$ is an optional linker group connecting the main chain of the polymer, $P_1$, to the moiety. $L_2$ can be any group known to those of skill in the art.

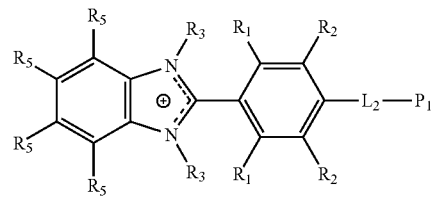

Formula (IV)

Alternatively, attachment can be through an $R_3$ position on the benzimidazolium, as illustrated in Formula (V) below.

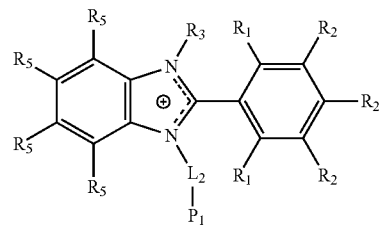

Formula (V)

In one embodiment, the moiety M2 is incorporated as a pendant moiety attached to the backbone of the polymer. It will be appreciated that the moiety may be directly connected to the polymer backbone or there may be additional moieties (e.g., linker groups, $L_2$) in between the moiety and the polymer backbone. Once again, attachment can come at any of the $R_1$, $R_2$, $R_3$, or $R_5$ positions.

For example, attachment can be through an $R_2$ position on the aryl, as illustrated in Formula (VI) below.

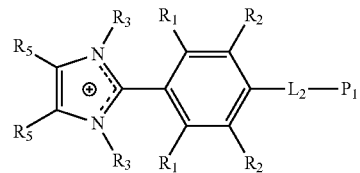

Formula (VI)

Similarly, attachment can be through an $R_3$ position on the imidazolium, as illustrated in Formula (VII) below.

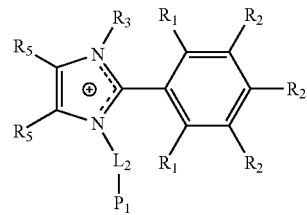

Formula (VII)

Given the multiple available locations on the moieties for attachment to a polymer main chain, the moieties can be attached to multiple polymer chains (e.g., as part of a crosslink). An exemplary embodiment illustrating crosslinking between two polymer chains, $P_1$ and $P_2$, via the $R_3$ positions, is illustrated in Formula (VIII) below. It will be appreciated that the crosslinking capabilities of the moieties are not limited to the illustrated embodiment.

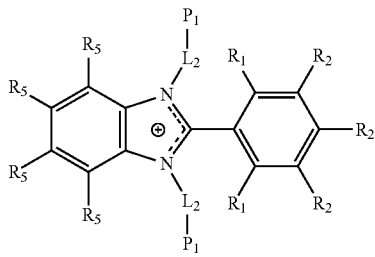

Formula (VIII)

In one embodiment, the moiety M1 is grafted onto an already-formed polymer. For example, using a benzimidazole with a monosubstituted $R_3$ position (Formula IX), mixed with $P_1$ and heated can produce a pendant benzimidazolium (Formula V) connected at the formerly vacant $R_3$ position. Examples of $P_1$ include alkylhalide-containing polymers such as chloromethylated polysulfone and poly (chloromethylstyrene), including perfluorinated polymers containing haloalkyl groups. In addition, perfluorinated sulfonyl halide-containing polymers, or polymers containing acyl halides can be functionalized using this method.

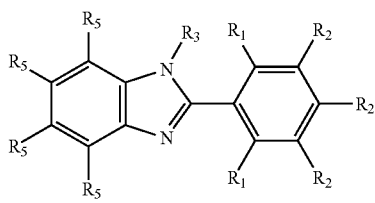

Formula (IX)

Alternatively, the moiety M2 is grafted onto an already-formed polymer using an imidazole with a monosubstituted $R_3$ position (Formula X) to produce the pendant imidazolium (Formula VII).

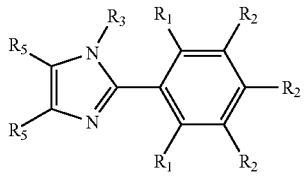

Formula (X)

In certain embodiment, the disclosed cationic moieties form a salt with an anion. Any anion sufficient to balance the charge of the moiety-containing polymer can be used. Representative anions include iodide, hydroxide, chloride, bromide, fluoride, cyanide, acetate, carbonate, nitrate, sulfate, triiodide, phosphate, triflate, and tosylate.

The polymers containing the moieties can be of any size known to those of skill in the art.

In another aspect, an ionic membrane is provided. In one embodiment, the ionic membrane comprises a cationic polymer incorporating the moiety of any of the Formulas disclosed herein. The membranes created from these polymers are stable in high pH environments, a feat that most present technologies are not capable of withstanding.

The preferred method for membrane fabrication is through drop casting from polar aprotic solvents (e.g. dimethylsulfoxide).

In one embodiment, the membrane further comprises an additional polymer capable of forming ionic interactions with the cationic polymer. In one embodiment the additional polymer is anionic, causing immediate ionic interactions with the cationic polymer.

In another embodiment, the additional polymer is acidic. After deprotonation of this acidic polymer, it becomes anionic, and thus forms ionic interactions with the cationic polymer. In one embodiment, the acidic polymer comprises a benzimidazole-containing moiety, as described in the exemplary embodiments and Scheme (I) below. In certain embodiments, the deprotonated benzimidazole-containing moiety is any moiety of Formula (XI).

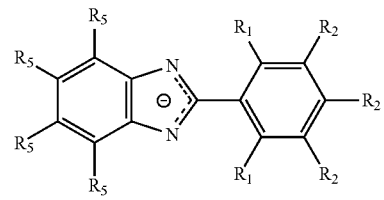

Formula (XI)

wherein:

$R_1$=methyl, trifluoromethyl, alkyl, perfluoroalkyl, heteroalkyl, alkoxy, perfluoroalkoxy, halo, aryl, heteroaryl group or polymer, where $R_1$ are the same or different;

$R_2$=hydrogen, any group, or a polymer where $R_2$ are the same or different; and $R_5$=hydrogen, any group, or a polymer, where $R_5$ are the same or different.

Wherein at least one of $R_1$, $R_2$, and $R_5$, is a polymer.

In one embodiment, the cationic polymer is bound to an anionic polymer created in situ after the deprotonation of the acidic polymer.

In another aspect, a neutral polymer is provided. In one embodiment, the neutral polymer has Formula (XII):

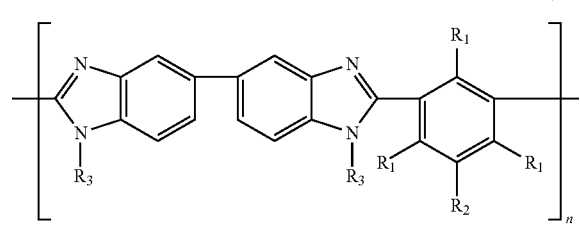

Formula (XII)

In another aspect, an ionic membrane is provided. In one embodiment, the ionic membrane includes a cationic polymer of Formula (XIII):

Formula (XIII)

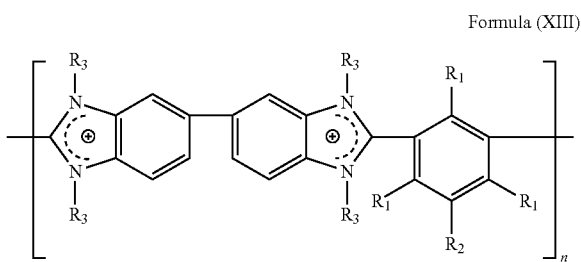

In a further embodiment, the ionic membrane further comprises an anionic polymer of Formula (XIV):

Formula (XIV)

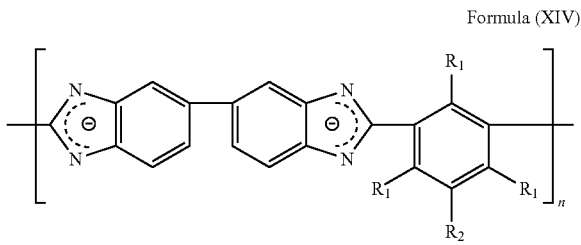

In one embodiment, in Formulas (XII) to (XIV), $R_1$ and $R_3$ are methyl groups and $R_2$ is hydrogen.

In a further embodiment, the cationic polymer is ionically bound to the anionic polymer according to Scheme (I):

Scheme (I)

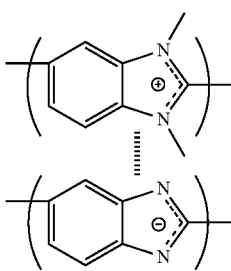

The ionic membrane can be formed by the following reaction, Scheme (II):

Scheme (II)

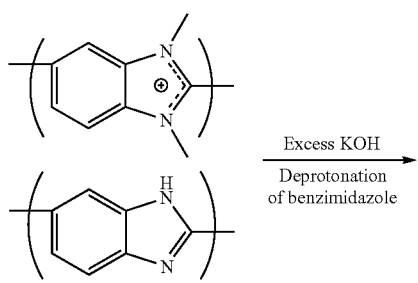

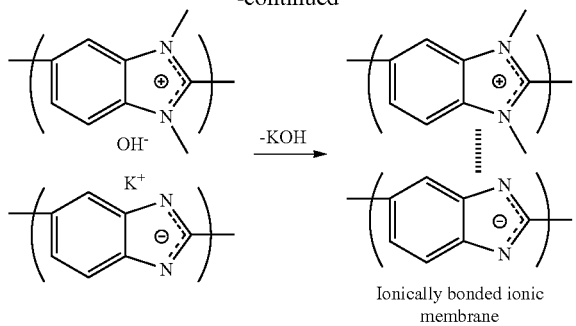

Ionically bonded ionic membrane

The invention is described using the following definitions unless otherwise indicated.

The term "alkyl" refers to a straight or branched hydrocarbon groups having the indicated number of carbon atoms. Representative alkyl groups include methyl, ethyl, propyl, 2-propyl, s- and t-butyl, butyl, pentyl, and hexyl groups.

The term "perfluoroalkyl" refers to straight or branched fluorocarbon chains. Representative alkyl groups include trifluoromethyl, pentafluoroethyl, etc.

The term "heteroalkyl" refers to a straight or branched chain alkyl groups having the indicated number of carbon atoms and where one or more of the carbon atoms is replaced with a heteroatom selected from O, N, or S.

The term "alkoxy" refers to an alkyl or cycloalkyl group as described herein bonded to an oxygen atom. Representative alkoxy groups include methoxy, ethoxy, propoxy, and isopropoxy groups.

The term "perfluoroalkoxy" refers to a perfluoroalkyl or cyclic perfluoroalkoxy group as described herein bonded to an oxygen atom. Representative perfluoroalkoxy groups include trifluoromethoxy, pentafluoroethoxy, etc.

The term "aryl" refers to an aromatic hydrocarbon group having 6 to 10 carbon atoms. Representative aryl groups include phenyl groups.

The term "aralkyl" refers to an alkyl or cycloalkyl group as defined herein with an aryl group as defined herein substituted for one of the alkyl hydrogen atoms. A representative aralkyl group is a benzyl group.

The term "heteroaryl" refers to a 5- to 10-membered aromatic monocyclic or bicyclic ring containing 1-4 heteroatoms selected from O, S, and N. Representative 5- or 6-membered aromatic monocyclic ring groups include pyridine, pyrimidine, pyridazine, furan, thiophene, thiazole, oxazole, and isooxazole. Representative 9- or 10-membered aromatic bicyclic ring groups include benzofuran, benzothiophene, indole, pyranopyrrole, benzopyran, quionoline, benzocyclohexyl, and naphthyridine.

The term "halogen" or "halo" refers to fluoro, chloro, bromo, and iodo groups.

The term "bulky group" refers to a group providing steric bulk by having a size at least as large a methyl group.

The preparation of representative polymers incorporating the moiety and their characterization are described in the following.

Anion-Conducting Moiety Incorporated into Polymer Main Chain

Figure 4:
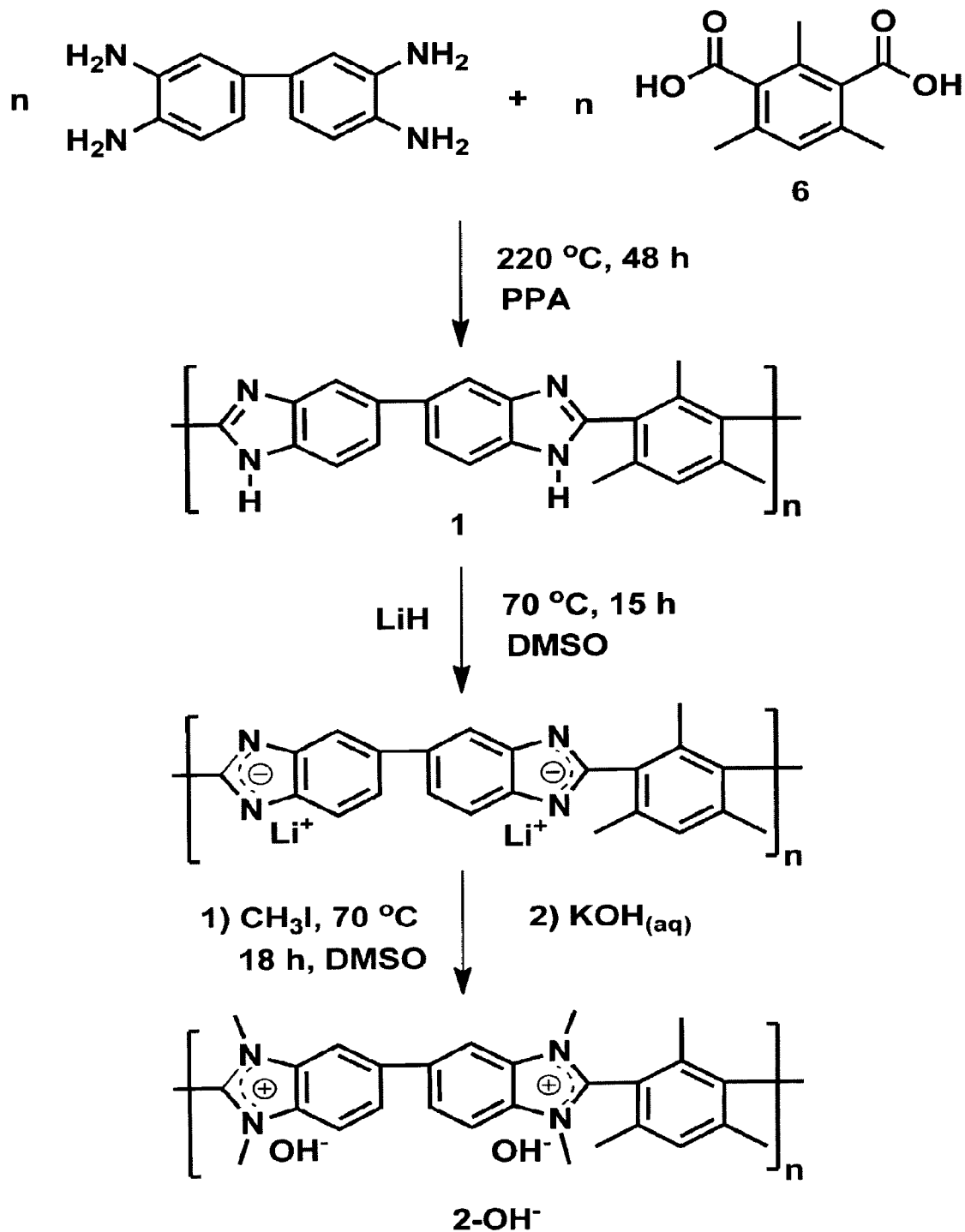
FIG. 4: Synthesis of mesitylene-containing poly(benzimidazole) (1) and subsequent dimethylation and hydroxide exchange to form an alkali anion exchange material (2-OH⁻).

An exemplary polymer disclosed herein (Mes-PBI, 1) is a sterically-crowded polybenzimidazole synthesized from a tetra-amine and a mesitylene-containing diacid. The neutral polymer 1 is illustrated in FIG. 4. Dialkylation of the benzimidazole units with iodomethane results in poly(2,2'-(m-mesitylene)-5,5'-bis-(N,N'-dimethylbenzimidazolium iodide) (Mes-PDMBI, 2-I$^-$). Subsequent ion-exchange to the hydroxide form results in (2-OH$^-$), an alkali anion exchange polymer.

Stable imidazolium and benzimidazolium hydroxides are not known to exist. Based on reported hydroxide decomposition mechanisms of small molecule benzimidazolium salts, we propose that crowding around the reactive C2-position by installation of adjacent bulky groups will hinder nucleophilic attack by OH⁻, thus improving hydroxide stability. Additionally, we propose a similar mechanism is relevant for imidazolium salts.

Figure 2A:
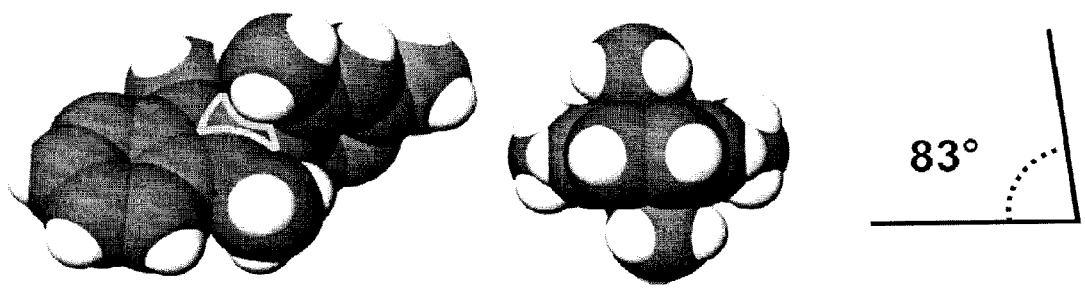
FIGS. 2A and 2B: Simulation showing steric crowding around the C2-position and the dihedral angle of the inter-ring C—C bond for 4 (FIG. 2A) and 5 (FIG. 2B). The C2-carbon is highlighted with an orange border for clarity.
Figure 2B:
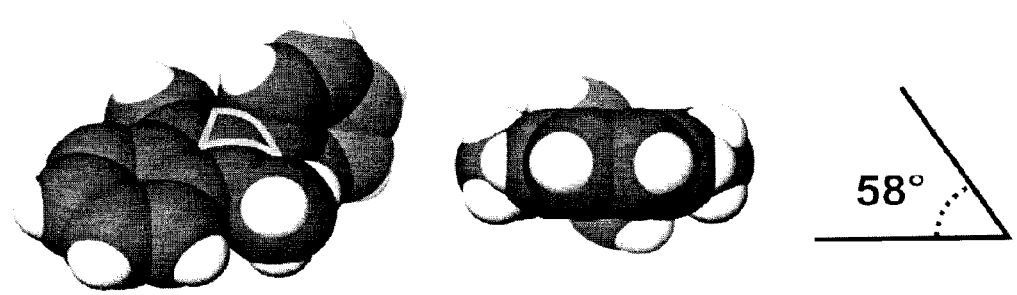

To examine this, we compared benzimidazolium salts in which a bulky mesityl (4) and the less-bulky phenyl (5) group were attached at the C2-position. Computer models of these compounds (FIG. 2A) predict twisting of 4 to result in juxtapositioned methyl groups that sit directly above and below the labile C2-position. Contrast this with the phenyl-substituted analogue, 5, which renders the C2 carbon exposed (FIG. 2B).

Figure 3:
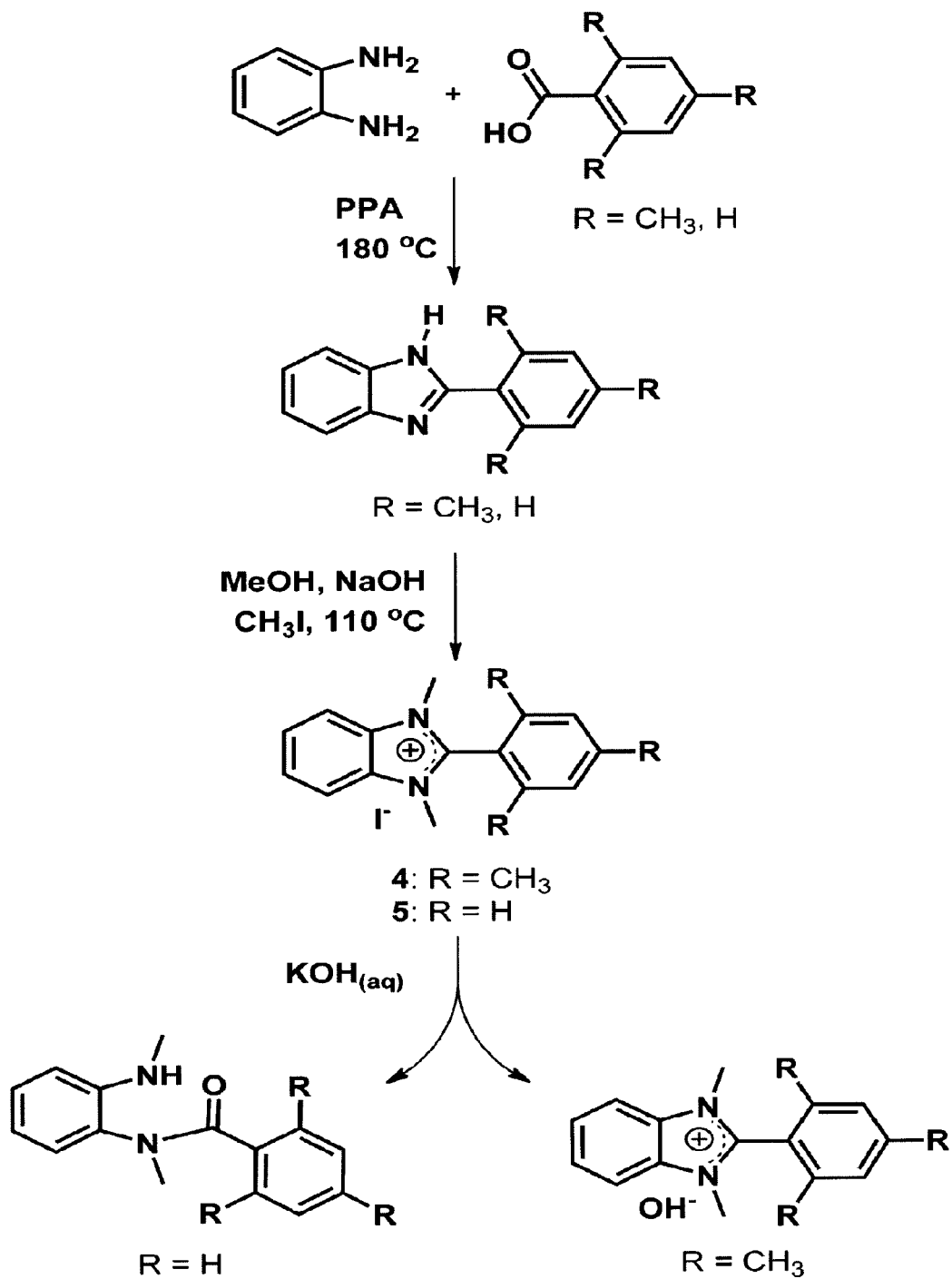
FIG. 3: Synthesis of 2-aryl-1,3-dimethylbenzimidazolium compounds (4, 5) and the products (if formed) upon exposure to KOH solution.

Compounds 4 and 5 were synthesized as shown in FIG. 3 (the Examples section). The stability of these compounds was assessed spectroscopically upon their dissolution in alkaline solutions (0.3M and 1.3M KOH). Whereas 4 was found to be stable in both solutions of KOH, 5 was distinctly unstable, exhibiting half-lives of 1 h and <10 min in 0.3M and 1.3M KOH, respectively (the Examples section). The decomposition product of 4 (see FIG. 3), determined by FTIR and $^1$H NMR spectroscopy (see the Examples section) is consistent with OH⁻ attack at the C2 position of the benzimidazolium ring.

Satisfied with the stability of the hydroxide form of 4, both in alkaline solutions and in the solid state, we synthesized the analogous polymer that possessed a sterically-crowded C2 position using a mesitylene-containing diacid monomer (2,4,6,-trimethylisophthalic acid, 6), made in a four step synthesis from bis(dichloromethyl)mesitylene (see Examples section). Polymerization of 6 with 3,3'-diaminobenzidine was carried out to produce polymer 1.

It will be appreciated that while 1 is specifically illustrated herein having a mesitylene moiety, the compounds of the invention can be varied as illustrated in FIG. 1A.

1 was subsequently methylated by deprotonation of the acidic protons using LiH, followed by reaction with excess CH₃I, as illustrated in FIG. 4, resulting in a polymer having a degree of methylation >95%, as determined by $^1$H NMR spectroscopy (see the Examples section).

Conversion of 2-I⁻ to 2-OH⁻ was achieved by soaking a film of 2-I⁻ in 0.5M KOH solution. During the conversion to the hydroxide form, the polymer film dissolved, which facilitated studies of the alkaline stability of 2-OH⁻ using $^1$H NMR spectroscopy. In 0.5M KOH, 2-OH⁻ showed no structural degradation over 30 days, (to experimental error, <1%) (spectra and analyses are shown in subsequent FIGURES).

Figure 5:
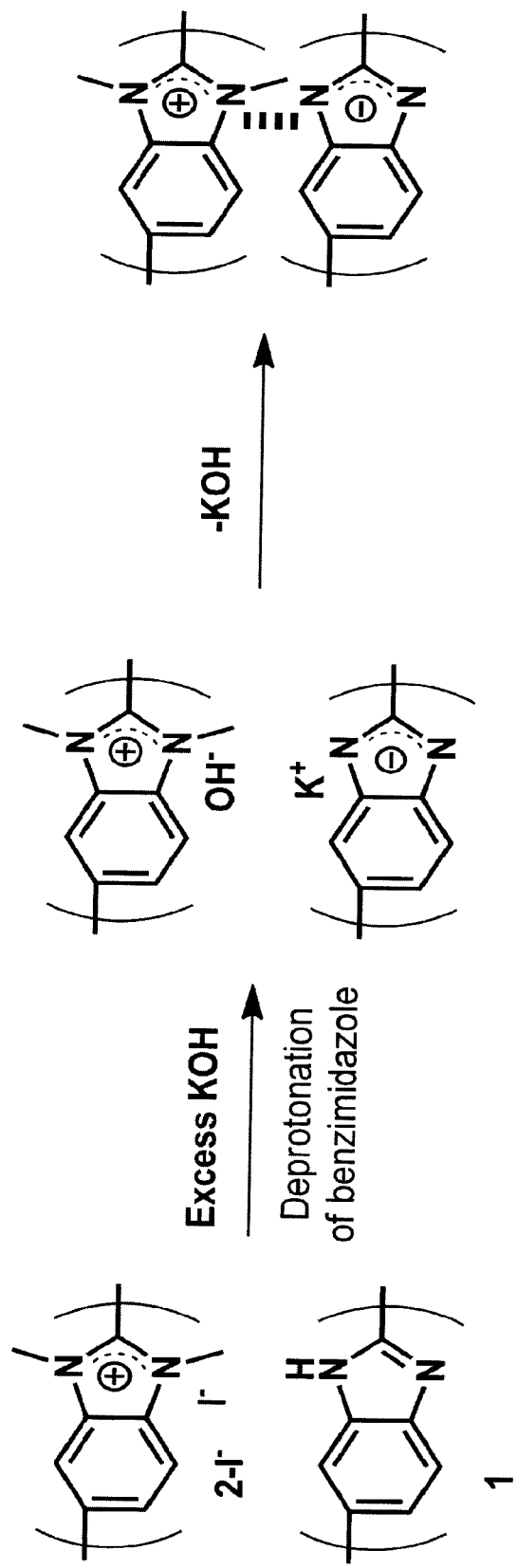
FIG. 5: Formation of polymer-polymer ionic interactions between pairs of positively charged benzimidazolium and negatively charged benzimidazolide rings expected in blends of Mes-PDMBI (2) and Mes-PBI (1) after exposure to aqueous KOH solutions.

The water-solubility of polymer 2-OH⁻ is a potential limitation in its application as an OH⁻ ion exchange membrane. To prevent dissolution we developed a novel strategy that utilizes the ability of PBIs to be converted into cationic and anionic forms. Membranes were prepared from blends of polymer 2 in the iodide form (2-I⁻) and a lesser amount of neutral Mes-PBI (1). Exposing the resulting blend membranes to basic solution removes the weakly acidic N—H protons in 1, rendering the ring negatively charged (FIG. 5), and independently, but simultaneously, converts 2-I⁻ to 2-OH⁻. Removal of excess KOH by washing renders the film insoluble by virtue of the ionic interaction between the negatively-charged benzimidazolide and positively-charged benzimidazolium rings.

The fraction of 2-I⁻ to 1 in the original blend determines the fraction of non-neutralized 2-OH⁻ remaining in the blend. Although PBIs have been used extensively in the crosslinking of proton exchange membranes, they have not been used in this manner to crosslink anion exchange membranes.

TABLE 1

Properties of blend membranes (1:2-OH⁻).

| 1:2-OH⁻[a] | Water Uptake[b] (wt %) | IEC[b,c] (mmol · g⁻¹) | $\lambda^{b,d}$ (H₂O/OH⁻) | $\sigma_{OH^-}{}^{b,e}$ (mS · cm⁻¹) |
|---|---|---|---|---|
| 0:100 | n/a[f] | 4.5 | n/a[f] | n/a[f] |
| 25:75 | 162 ± 10 | 2.0 | 45 | 9.6 ± 0.1 |
| 30:70 | 119 ± 6 | 1.5 | 32 | 10.1 ± 0.1 |
| 34:66 | 82 ± 3 | 1.0 | 22 | 13.2 ± 0.1 |

[a] mass ratio of 1 to 2-OH⁻ in the blend membrane.
[b] see experimental procedures below.
[c] ion exchange capacity.
[d] ratio of water molecules to OH.
[e] anionic conductivity measured at 21° C., hydrated.
[f] not applicable, membrane dissolved.

The IEC of the membranes was controlled by varying the ratio of 2-I⁻ to 1 in the original membrane (Table 1), keeping in mind the subtractive effect of acidic polymer 1 on 2-OH⁻ after treatment with base and removal of excess KOH (note, the parent polymer, 2-OH⁻ has an IEC of 4.5 mmol g⁻¹). When blended with 25, 30, and 34% of 1, the resultant IEC drops accordingly to 2.0, 1.5, and 1.0 mmol g⁻¹. The experimental values measured by back titration match the theoretical values calculated. Commensurate with the fraction of 1 incorporated into the blend, and hence a reduction in IEC, there is a decrease in water uptake and swellability. Preliminary measurements on non-optimized membranes determine the conductivity to be in the 9-13 mS·cm⁻¹ range. This is in keeping with typical anion conductivities in aqueous solution, such as quaternary ammonium-substituted poly(aryl ether sulfone), but lower than the poly(phenylene) based polymers.

In conclusion, a new anion exchange material with hydroxide stability is presented. Realizing the enhanced stability of this ubiquitous class of molecule, which results from reducing access of OH⁻ to reactive C2-positions in the benzimidazole unit, creates new opportunities to prepare new benzimidazoles with unique or specialized properties. In addition, a novel and unique approach to ionic cross-linking has been demonstrated for polybenzimidazoles that provides new opportunities to create novel ionic polymer blends.

Experimental Materials

All chemicals were obtained from Sigma-Aldrich Canada Ltd. and used as received unless otherwise stated. Bis-(chloromethyl)-mesitylene was purchased from Alfa Aesar Canada. 3,3'-diaminobenzidine was purified according to known procedures. Deionized H₂O was purified using a Millipore Gradient water purification system. $^1$H NMR spectra were obtained using a Varian Unity Spectrometer operating at 500 MHz. Compounds were dissolved in deuterated solvents at a concentration of ~20 mg/mL. Fourier transform infrared spectroscopy (FTIR) was performed on a Bomem FTLA2000-154 FTIR system. Polymer films for FTIR analysis were drop-cast from dilute DMSO solution onto a glass slide and dried under vacuum at 80° C. for 2 h.

Synthesis of Bis-(acetomethyl)-mesitylene

Bis-(acetomethyl)-mesitylene (5) was made according to a known synthesis. 10.0 g (46 mmol) Bis-(chloromethyl)- mesitylene was dissolved in 200 mL acetic acid and added to a suspension of 20.0 g silver acetate in an 200 mL of acetic acid in a 1 L round bottom flask. The solution was refluxed with stirring for 2 h. The remaining solid was filtered and the filtrate was added to a beaker of ice. The resulting white precipitate was collected and dried (11.6 g, 95% yield).

Figure 6:
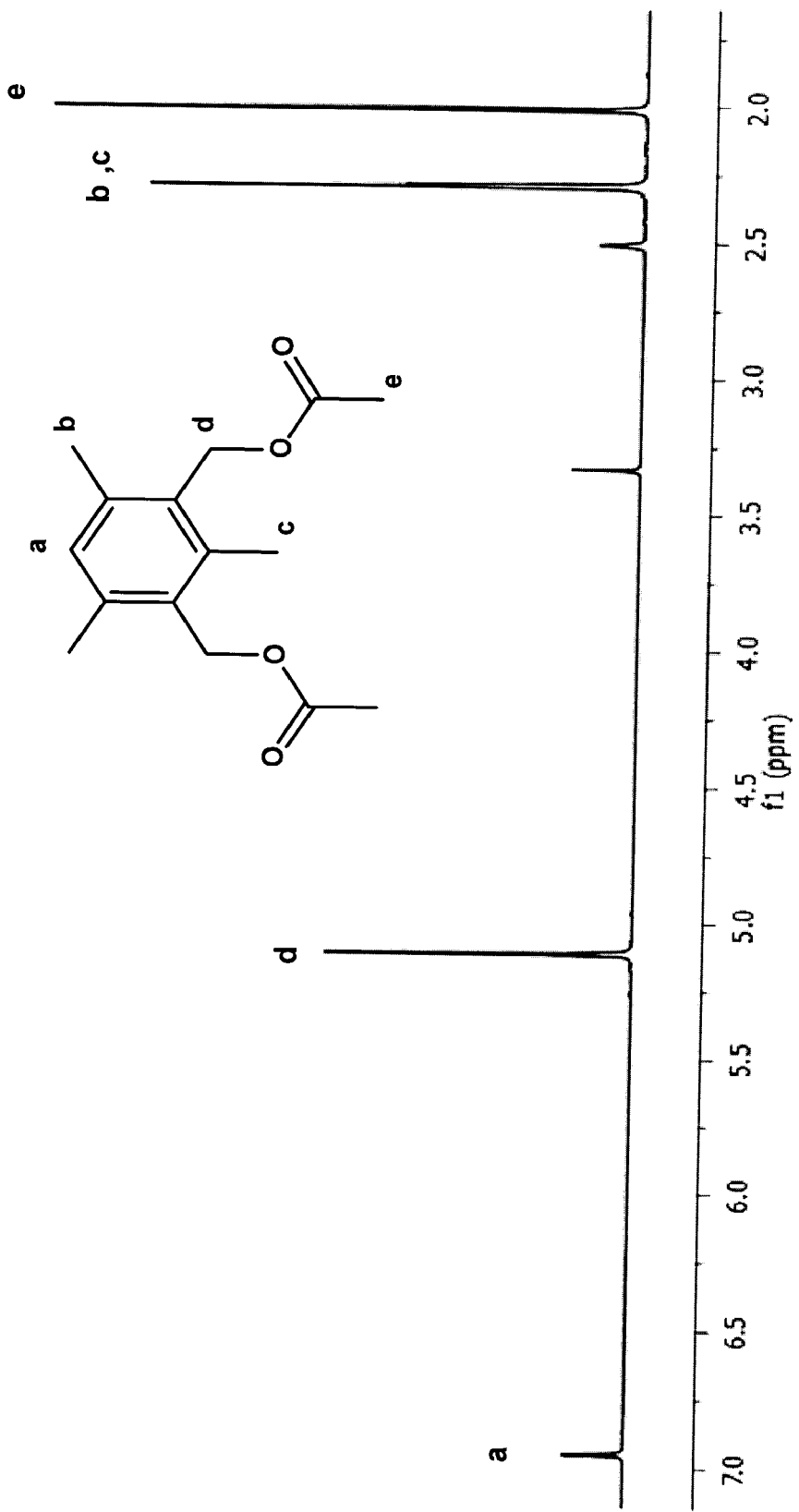
FIG. 6: $^1$H NMR spectrum of bis-(acetomethyl)-mesitylene in DMSO-$d_6$.

Bis-(acetomethyl)-mesitylene $^1$H NMR (500 Hz, DMSO-d$_6$, δ, ppm): 6.95 (1H, s, H$_A$), 5.11 (4H, s, H$_D$), 2.29 (9H, s, H$_{B,C}$), 2.01 (6H, s, H$_E$). FTIR (KBr Disk): 3000-2850 (C—H stretch), 1735 (ester C=O stretch), 1220 (ester C—O stretch); FIG. 6.

Synthesis of bis-(hydroxymethyl)-mesitylene

Bis-(hydroxymethyl)-mesitylene was made by dissolving 10.0 g of bis-(acetomethyl)-mesitylene (38 mmol) in 400 mL of 15% KOH in ethanol. The solution was refluxed with stirring for 2 h. Following reflux, ethanol was removed under vacuum, leaving behind a pale yellow solid. The solid was washed with water to remove the KOH, leaving a pale yellow powder. The material was recrystallized from hot 1,4-dioxane, resulting in 5.1 g of needle-like white crystals (75% yield).

Figure 7:
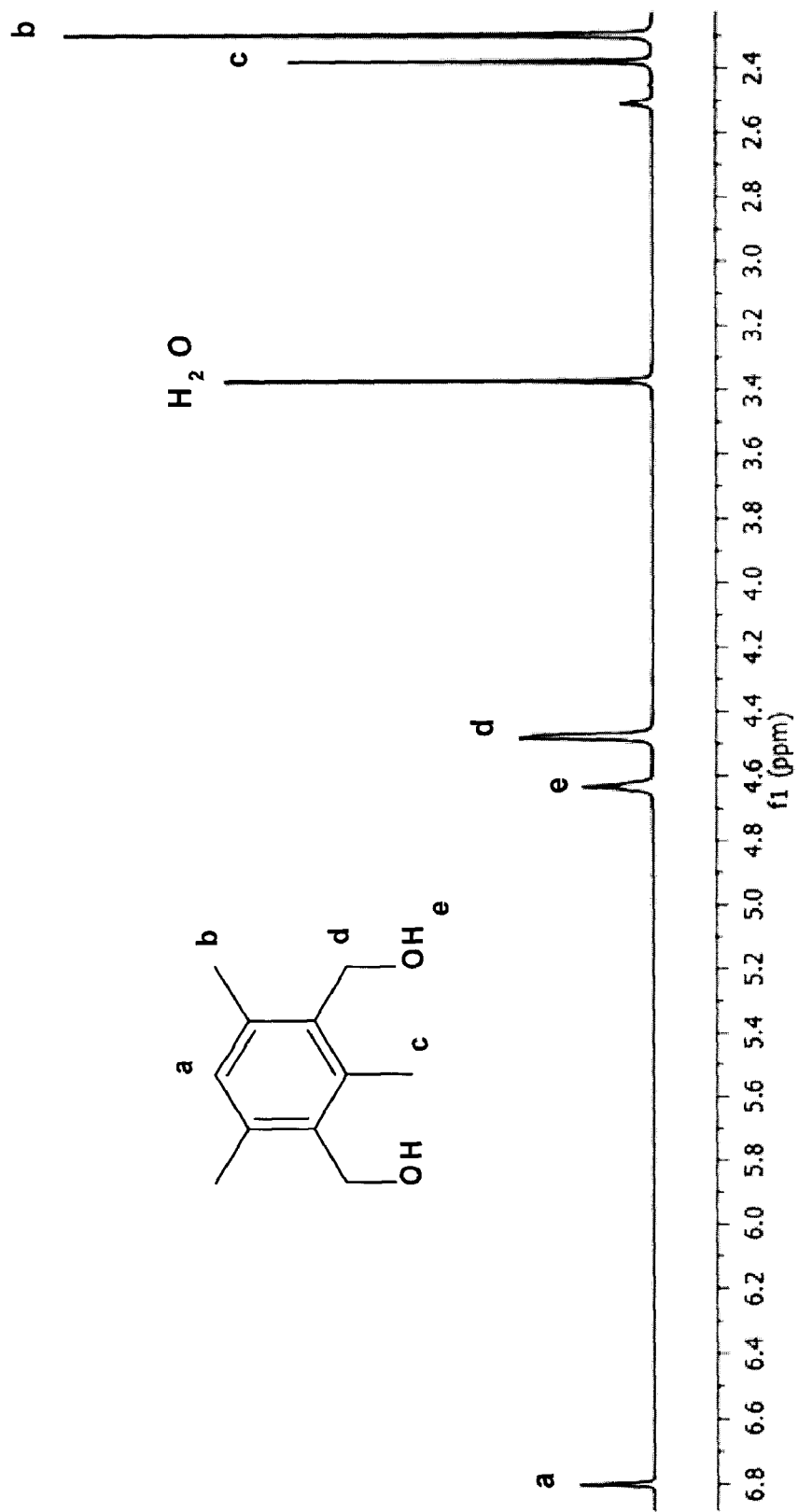
FIG. 7: $^1$H NMR of bis-(hydroxymethyl)-mesitylene in DMSO-$d_6$.

Bis-(hydroxymethyl)-mesitylene $^1$H NMR (500 Hz, DMSO-d$_6$, δ, ppm): 6.80 (1H, H$_A$), 4.63 (2H, t, 3 Hz, H$_E$), 4.47 (4H, d, 3 Hz, H$_D$), 2.38 (3H, s, H$_C$), 2.30 (6H, s, H$_B$). FTIR (KBr Disk): 3500-2800 (alcohol O—H stretch), 1002 (alcohol C—O stretch); FIG. 7.

Synthesis of 2,4,6,-trimethylisophthalic acid (6)

2,4,6-Trimethylisophthalic acid was made by slowly adding Jones Reagent (30 g K$_2$Cr$_2$O$_7$, 70 mL H$_2$O and 25 mL conc. H$_2$SO$_4$) to a stirred suspension of bis-(hydroxymethyl)-mesitylene (5.0 g, 28 mmol) in 250 mL of acetone at 4° C. After adding the Jones Reagent, the solution was allowed to warm to room temperature, where it remained for 1 h. The mixture was then heated to 40° C. for 2 h. The acetone was removed under vacuum, leaving a green slurry. The mixture was filtered and thoroughly washed with 10% H$_2$SO$_{4(aq)}$, leaving a pale yellow solid. This solid was dissolved in 2M KOH$_{(aq)}$, activated carbon powder was added and the mixture was boiled for 30 min. The mixture was filtered to remove the carbon powder and the filtrate was neutralized with HCl. At low pH (<1), a colourless solid precipitated and was recovered by filtration. The product was purified by recrystallization in acetonitrile, resulting in 4.9 g (85% yield) of short colourless crystals.

2,4,6-Trimethylisophthalic acid (6)

Figure 8:
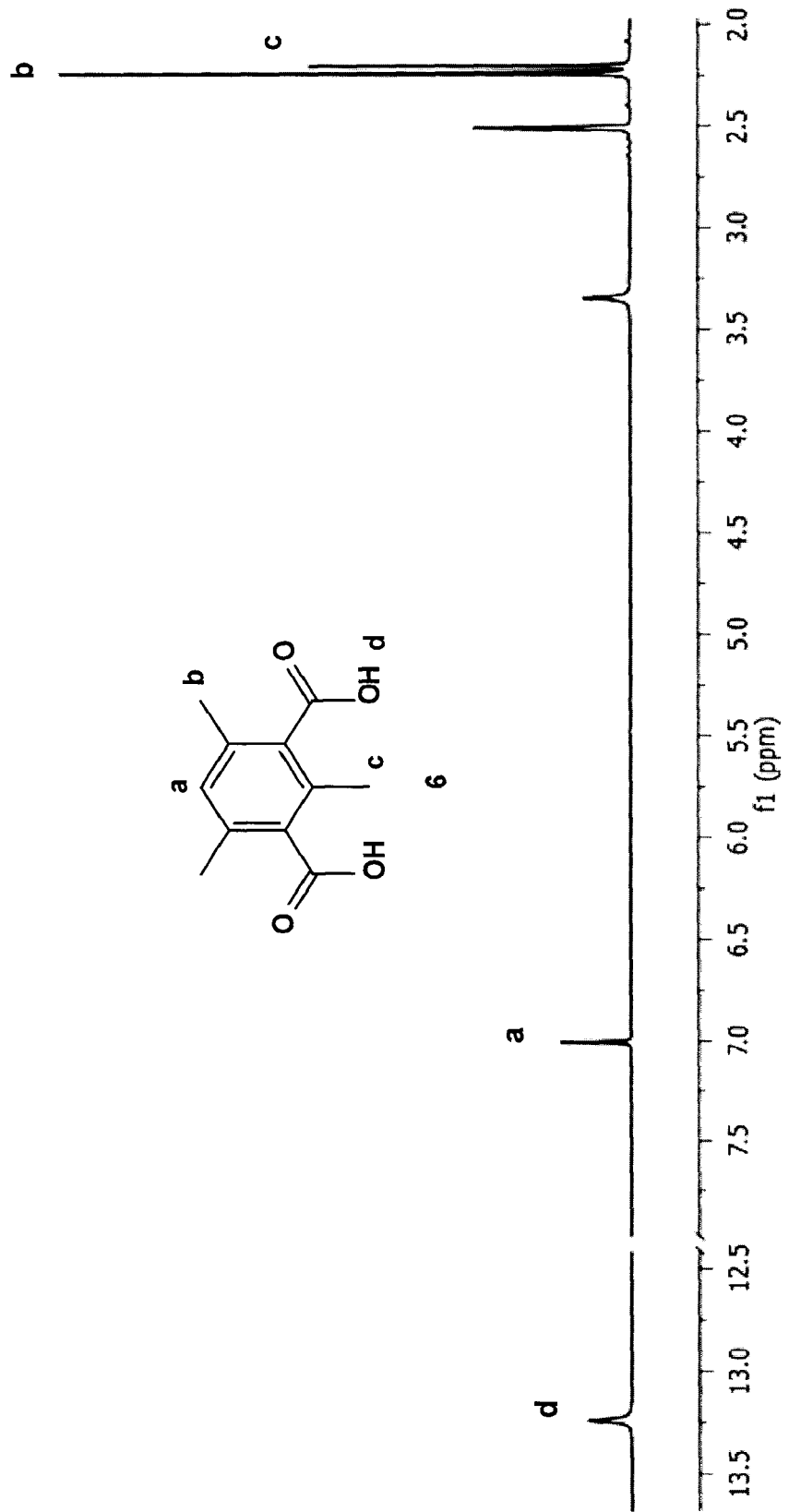
FIG. 8: $^1$H NMR spectrum of 2,4,6-trimethyl isophthalic acid (6) in DMSO-$d_6$.

$^1$H NMR (500 Hz, DMSO-d$_6$, δ, ppm): 13.24 (2H, s, H$_D$), 7.00 (1H, H$_A$), 2.24 (6H, s, H$_B$), 2.20 (3H, s, FTIR (KBr Disk): 3350-2500 (carboxylic acid O—H stretch), 1679 (aromatic carboxylic acid C=O stretch), 1282 (carboxylic acid C—O stretch); FIG. 8.

Synthesis of poly(2,2'-(m-mesitylene)-5,5'-dibenzimidazole), Mes-PBI (1)

1.5400 g of 3,3'-diaminobenzidine (7.18 mmol) and 60 g of polyphosphoric acid were added to a 200 mL three-necked round bottom flask equipped with an over-head stirrer, an argon inlet and a CaCl$_2$ drying tube. The flask was heated at 150° C. until the solid dissolved. 1.4965 g (7.18 mmol) of 2,4,6-trimethyl isophthalic acid (6) was added to the solution and the temperature increased to 180° C. After 4 h, the temperature was increased to 220° C. and the reaction continued for 48 h. The solution was then poured into deionized water to precipitate the polymer. The resulting red solid was collected and washed thoroughly with water and K$_2$CO$_3$ solution to remove residual acid. The washed solid was then milled into a powder yielding 2.49 g.

Mes-PBI (1)

Figure 9:
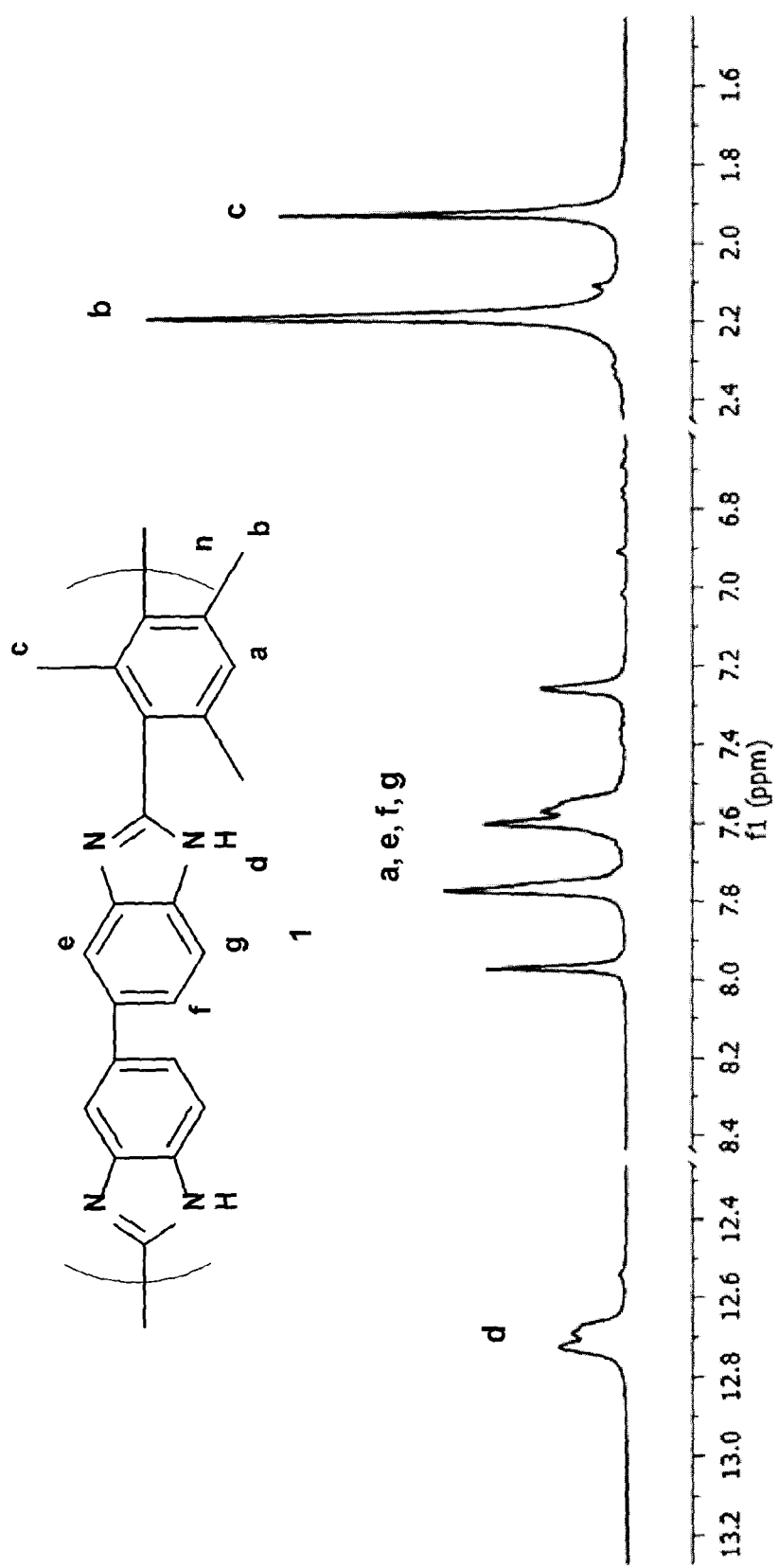
FIG. 9: $^1$H NMR of poly(2,2'-(m-mesitylene)-5,5'-dibenzimidazole), Mes-PBI (1) in DMSO-$d_6$.

$^1$H NMR (500 Hz, DMSO-d$_6$, δ, ppm): 12.72 (2H, s, H$_D$), 7.2-8.0 (7H, Aromatic protons H$_{A,E,F,G}$), 2.18 (6H, s, H$_B$), 1.92 (3H, s, FTIR (NaCl Disk): 3500-2400 (C—H and N—H stretch), 1278 (imidazole ring breathing); FIG. 9.

Synthesis of poly(2,2'-(m-mesitylene)-5,5'-bis-(N, N'-dimethylbenzimidazolium iodide), Mes-PDMBI (2-I$^-$)

1.0 g of 1 was dissolved in 60 mL of dry DMSO at 100° C. in a two necked round bottom flask fitted with a condenser under an inert atmosphere. The solution was allowed to cool to 40° C. and LiH (9 mmol, 50% excess with respect to the N—H groups in the polymer) was added. The temperature was raised to 70° C. and stirred overnight. The solution was allowed to cool to room temperature and CH$_3$I was added (0.9 mL, 2.0 g, 14 mmol). The flask was then heated to 70° C. for 4 h, upon which a second amount of CH$_3$I (0.9 mL, 2.0 g, 14 mmol) was added. The reaction continued overnight (14 h) and was precipitated into water. The resulting red solid was washed thoroughly with water, collected and dried under vacuum at 50° C. (1.7 g, 89% yield).

Mes-PDMBI (2-I$^-$)

Figure 10:
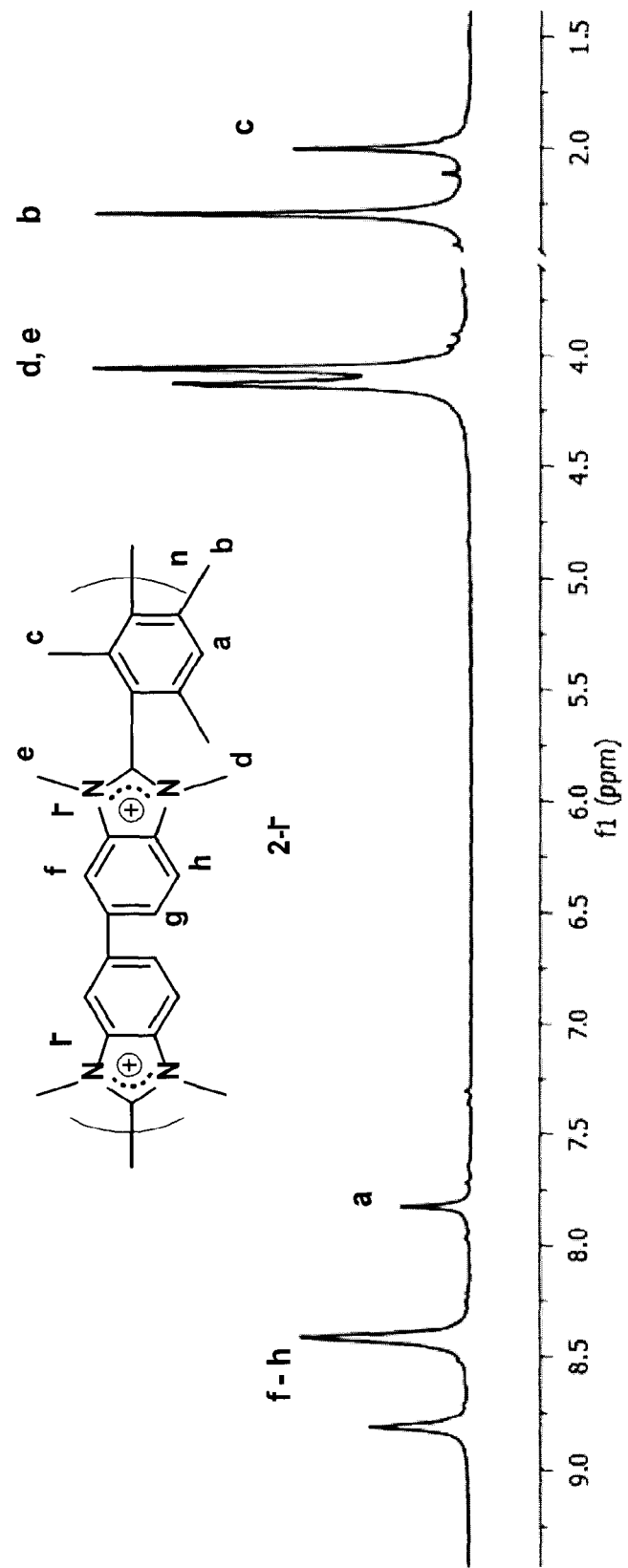
FIG. 10: $^1$H NMR spectrum of poly(2,2'-(m-mesitylene)-5,5'-bis-(N,N'-dimethylbenzimidazolium iodide), Mes-PDMBI (2-I$^-$) in DMSO-$d_6$.

$^1$H NMR (500 Hz, DMSO-d$_6$, δ, ppm): 8.82-8.48 (6H, m, H$_{F-H}$), 7.83 (1H, s, H$_A$), 4.10 (6H, m, H$_{D,E}$) 2.30 (6H, s, H$_B$), 2.00 (3H, s, He). FTIR (NaCl Disk): 3060 (aromatic C—H stretch), 1602 (C=N stretch), 1485 (benzimidazole ring deformation); FIG. 10.

Synthesis of poly(2,2'-(m-phenylene)-5,5'-dibenzimidazole), PBI

Poly(2,2'-(m-phenylene)-5,5'dibenzimidazole) was synthesized using a literature procedure.

Figure 11:
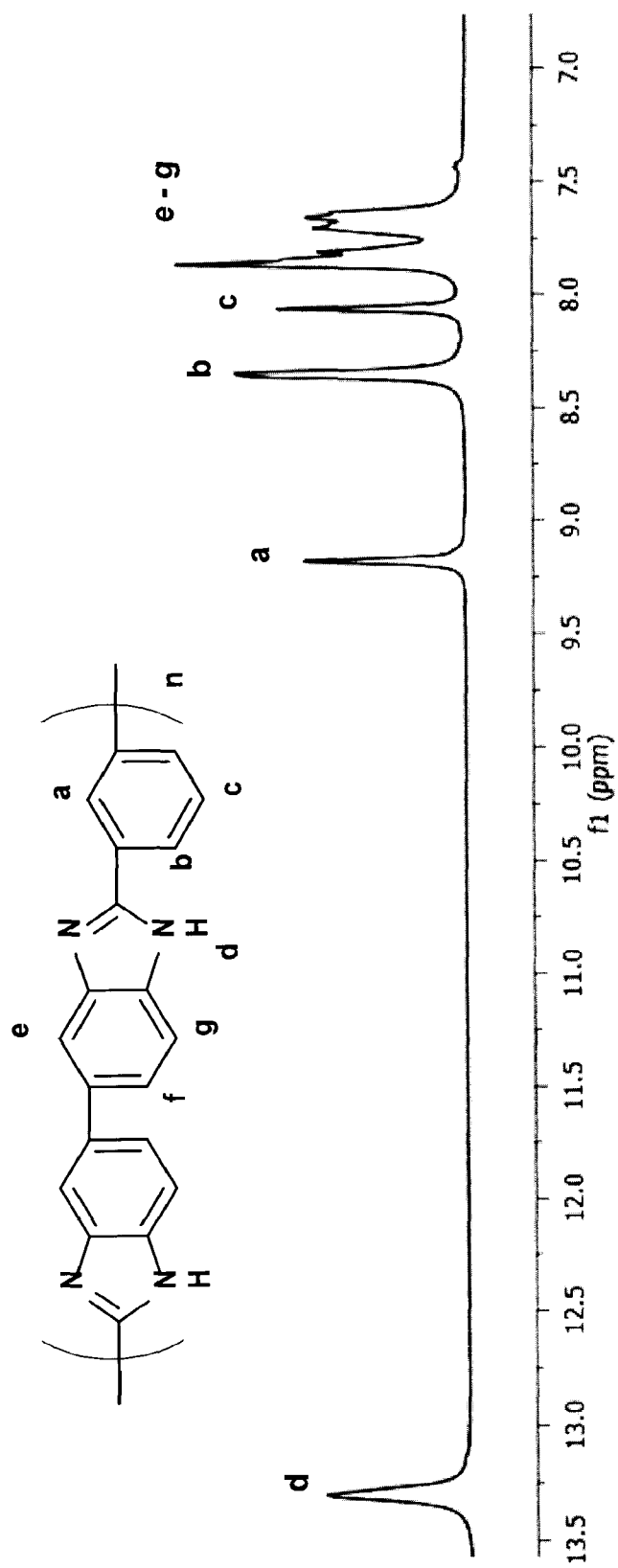
FIG. 11: $^1$H NMR of poly(2,2'-(m-phenylene)-5,5'-dibenzimidazole), PBI in DMSO-$d_6$.

PBI $^1$H NMR (500 Hz, DMSO-d$_6$, δ, ppm): 13.30 (2H, s, H$_D$), 9.18 (2H, s, H$_A$), 8.35 (2H, s, H$_B$), 8.06 (2H, s, H$_C$), 7.70-7.50 (6H, m, H$_{E-G}$). FTIR (NaCl Disk): 3600-2500 (C—H and N—H stretch), 1633 (C=N stretch), 1444 (benzimidazole ring deformation); FIG. 11.

Synthesis of poly(2,2'-(m-phenylene)-5,5'-bis-(N,N'-dimethylbenzimidazolium Iodide, PDMBI (3-I$^-$)

3-I$^-$ was as Follows

In a 250 mL round bottom flask, PBI (2 g, 6.5 mmol) was dissolved in dry NMP (100 mL). The flask was fitted with a condenser and placed under argon. The mixture was heated with stirring to 80° C. for 2 h until the solid had dissolved and was then allowed to cool to room temperature. LiH (0.3 g, 38 mmol) was then added slowly to the stirred solution. The temperature was increased to 80° C. and stirred for another 15 h. The remaining LiH solid was removed by centrifugation. The decanted solution was returned to the round bottom flask and allowed to cool to room temperature. Iodomethane (9 mL, 144 mmol) was added drop-wise over 15 min to the stirred solution. When the addition was complete, the reaction mixture was heated to 80° C. and stirred for 6 h. The light brown solid that precipitated during the course of the reaction was isolated by vacuum filtration and then dissolved in DMSO (60 mL). Additional iodomethane (9 mL, 144 mmol) was added and the mixture then heated to 80° C. for 15 h. After cooling, the polymer was precipitated in acetone and residual DMSO was removed via Soxhlet extraction of the precipitated polymer (using acetone as the extraction solvent) for 16 h.

Figure 12:
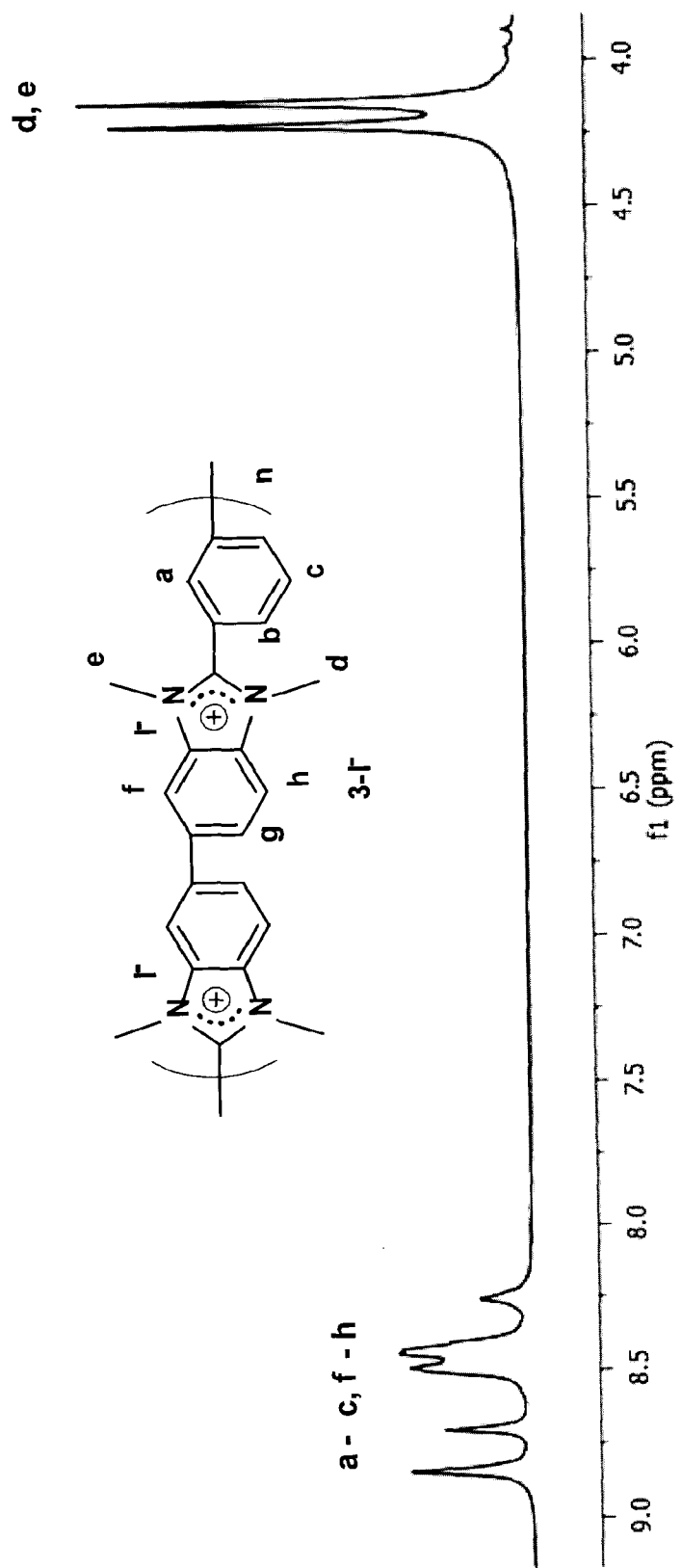
FIG. 12: $^1$H NMR spectrum of poly(2,2'-(m-phenylene)-5,5'-bis-(N,N'-dimethylbenz-imidazolium iodide)), PDMBI (3-I$^-$) in DMSO-$d_6$.

3-I$^-$ $^1$H NMR (500 Hz, DMSO-d$_6$, δ, ppm): 8.84-8.24 (10H, m, H$_{A-C,F,G}$), (12H, m, H$_{D,E}$). FTIR (NaCl Disk): 3060 (aromatic C—H stretch), 1614 (C=N stretch), 1515 (benzimidazole ring deformation), 1299 (C—N stretch); FIG. 12.

Synthesis of 2,4,6-trimethylbenzoic Acid 20 mL of 2-mesitylmagnesium bromide (1.0M in diethyl ether, 20 mmol) was added to a flask containing 60 mL of dry diethyl ether and solid carbon dioxide (dry ice). Additional dry ice was added throughout the course of the reaction as needed. After 30 min, the mixture was allowed to warm to room temperature and the solid was separated by filtration. The solid was dissolved in a 1M KOH$_{(aq)}$ solution followed by neutralization to pH 1 using HCl. This resulted in the precipitation of a white powder that was collected by filtration and dried under vacuum at 80° C. (2.52 g, 77% yield).

Figure 13:
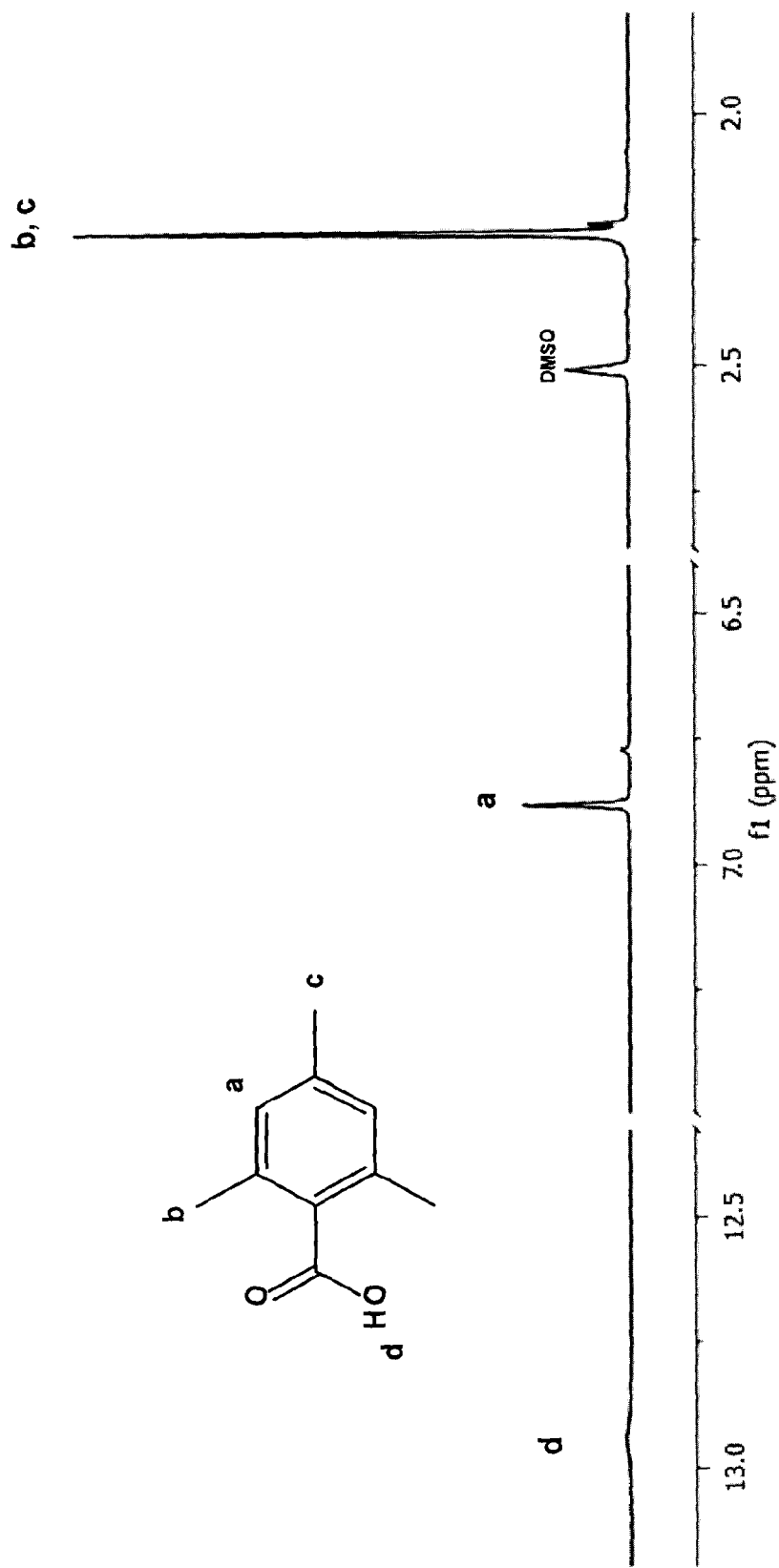
FIG. 13: $^1$H NMR spectrum of 2,4,6-trimethylbenzoic acid in DMSO-$d_6$.

2,4,6-Trimethylbenzoic Acid $^1$H NMR (500 Hz, DMSO-d$_6$, δ, ppm): 12.93 (1H, s, H$_D$), 6.88 (2H, s, H$_A$), 2.24 (9H, s, H$_{B,C}$). FTIR (KBr Disk): 3300-2500 (carboxylic acid O—H stretch), 1683 (aromatic carboxylic acid C=O stretch), 1292 (carboxylic acid C—O stretch), 858 (1, 2, 3, 5 tetra-substituted benzene C—H bend); FIG. 13.

Synthesis of 2-mesitylbenzimidazole

2-Mesitylbenzimidazole was synthesized by dissolving 1.5 g 1,2-phenylene diamine (14 mmol) in 40 g of PPA at 120° C. To this solution, 2.1 g of 2,4,6-trimethylbenzoic acid (13 mmol) was added and the temperature was increased to 150° C. After 16 h the solution was cooled to 60° C. and poured into water forming an off-white precipitate. The precipitate was separated by filtration and washed thoroughly with water, yielding 2.6 g of light brown powder (85% yield).

Figure 14:
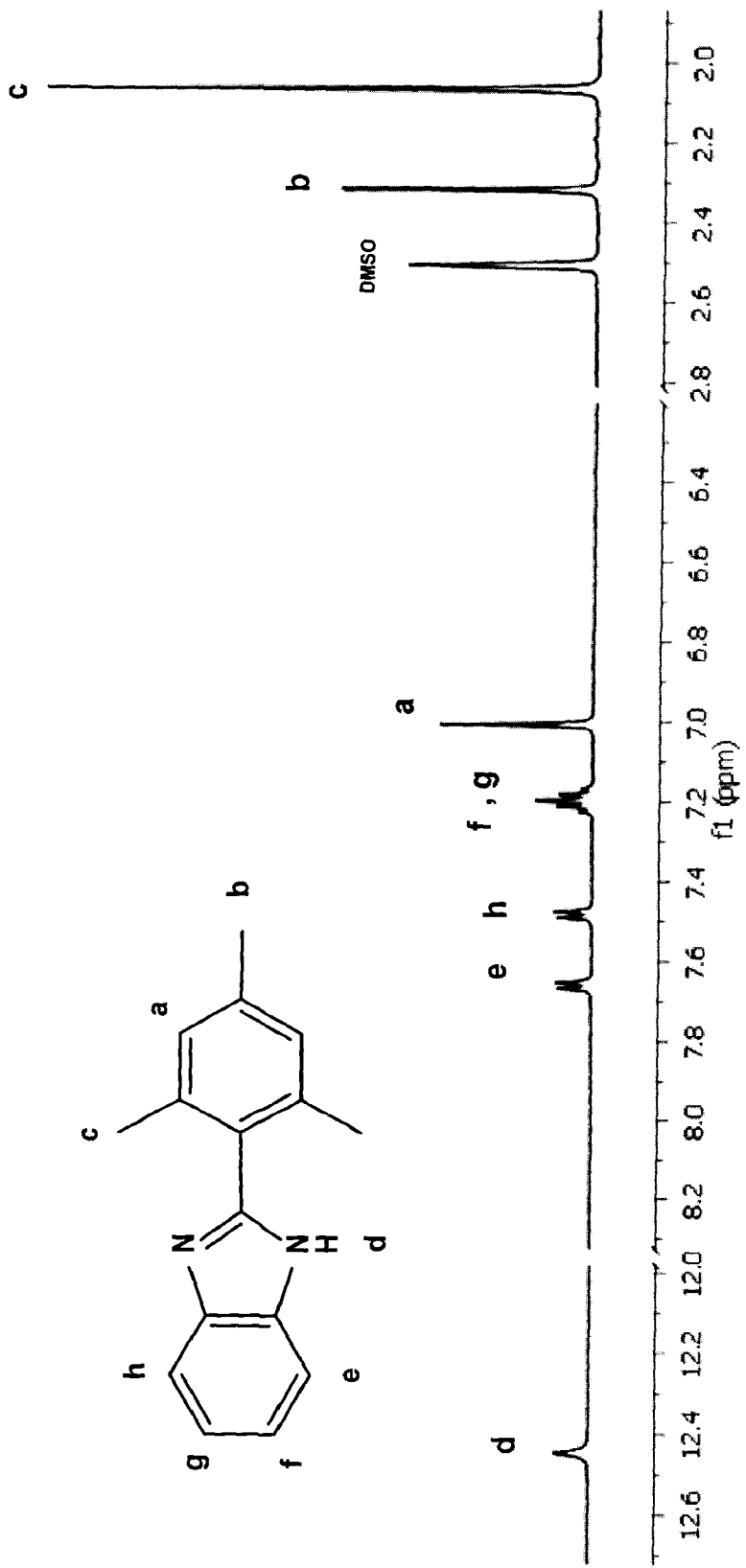
FIG. 14: $^1$H NMR spectrum of 2-mesitylbenzimidazole in DMSO-$d_6$.

2-Mesitylbenzimidazole $^1$H NMR (500 Hz, DMSO-d$_6$, δ, ppm): 12.46 (1H, s, H$_D$), 7.66 (1H, dd, 7 Hz, 2 Hz, H$_E$), 7.49 (1H, dd, 7 Hz, 2 Hz, H$_H$), 7.20 (2H, pent. d, 7 Hz, 2 Hz, H$_{F,G}$), 7.01 (2H, s, H$_A$), 2.32 (3H, s, H$_B$), 2.07 (6H, s, FTIR (KBr Disk): 3200-2300 (N—H stretch), 1614 (C=N stretch), 1450 (benzimidazole ring deformation), 1276 (imidazole ring breathing), 848 (1, 2, 3, 5 tetra-substituted benzene C—H bend); FIG. 14.

Synthesis of 2-phenylbenzimidazole

2-Phenylbenzimidazole was synthesized in a similar way to 2-mesityl-benzimidazole, except using benzoic acid instead of 2,4,6-trimethylbenzoic acid. Molar amounts of carboxylic acid and diamine used were as previously described to provide an off-white powder in 88% yield.

Figure 15:
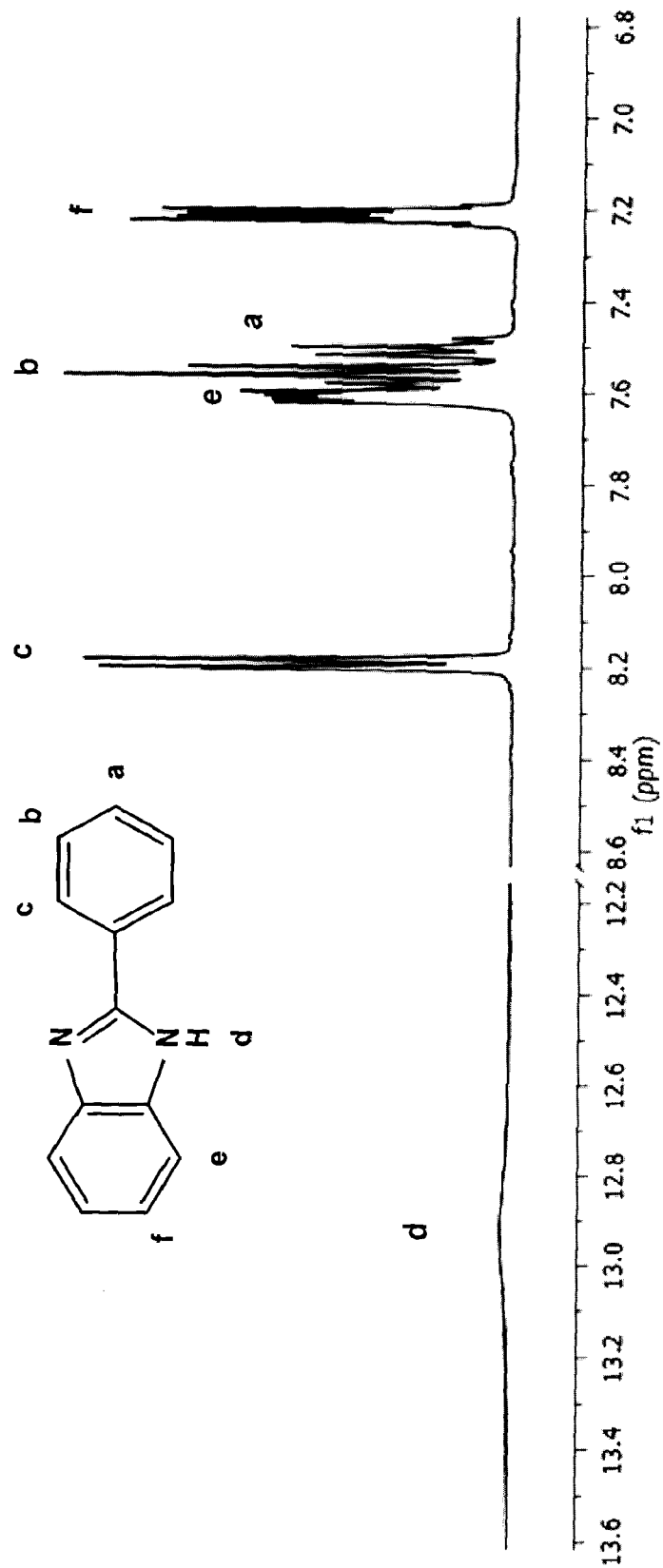
FIG. 15: $^1$H NMR spectrum of 2-phenyl-benzimidazole in DMSO-$d_6$.

2-Phenylbenzimidazole $^1$H NMR (500 Hz, DMSO-d$_6$, δ, ppm): 12.93 (1H, s, H$_D$), 8.19 (2H, d, 7 Hz, He), 7.61 (2H, dd, 4 Hz, 6 Hz, H$_E$), 7.56 (2H, m, H$_B$), 7.51 (1H, m, H$_A$), 7.21 (2H, dd, 3 Hz, 6 Hz, H$_F$). FTIR (KBr Disk): 3100-2400 (N—H stretch), 1444 (benzimidazole ring deformation), 1278 (imidazole ring breathing), 740 and 703 (monosubstituted benzene ring); FIG. 15.

Synthesis of 1,3-dimethyl-2-mesitylbenzimidazolium (4)

1,3-Dimethyl-2-mesityl-benzimidazolium (4) was synthesized by dissolving 1.0 g of 2-mesitylbenzimidazole (4 mmol) in 20 mL of methanol containing NaOH (0.17 g, 4 mmol) and methyl iodide (1.2 mL, 2.7 g, 13 mmol). The reaction was stirred and heated to 110° C. overnight in a pressure tube. Upon cooling, the mixture was neutralized with HCl and solvent was removed under vacuum. Any mono-methylated material was removed by dissolving the remaining solid in water followed by addition of NaOH solution until the solution became cloudy. This suspension was washed with ether, the aqueous layer collected, and the water removed under vacuum. The solid was recrystallized from hot ethanol to produce dark brown needle-like crystals, 0.85 g, 80% yield.

1,3-Dimethyl-2-mesitylbenzimidazolium (4)

Figure 16:
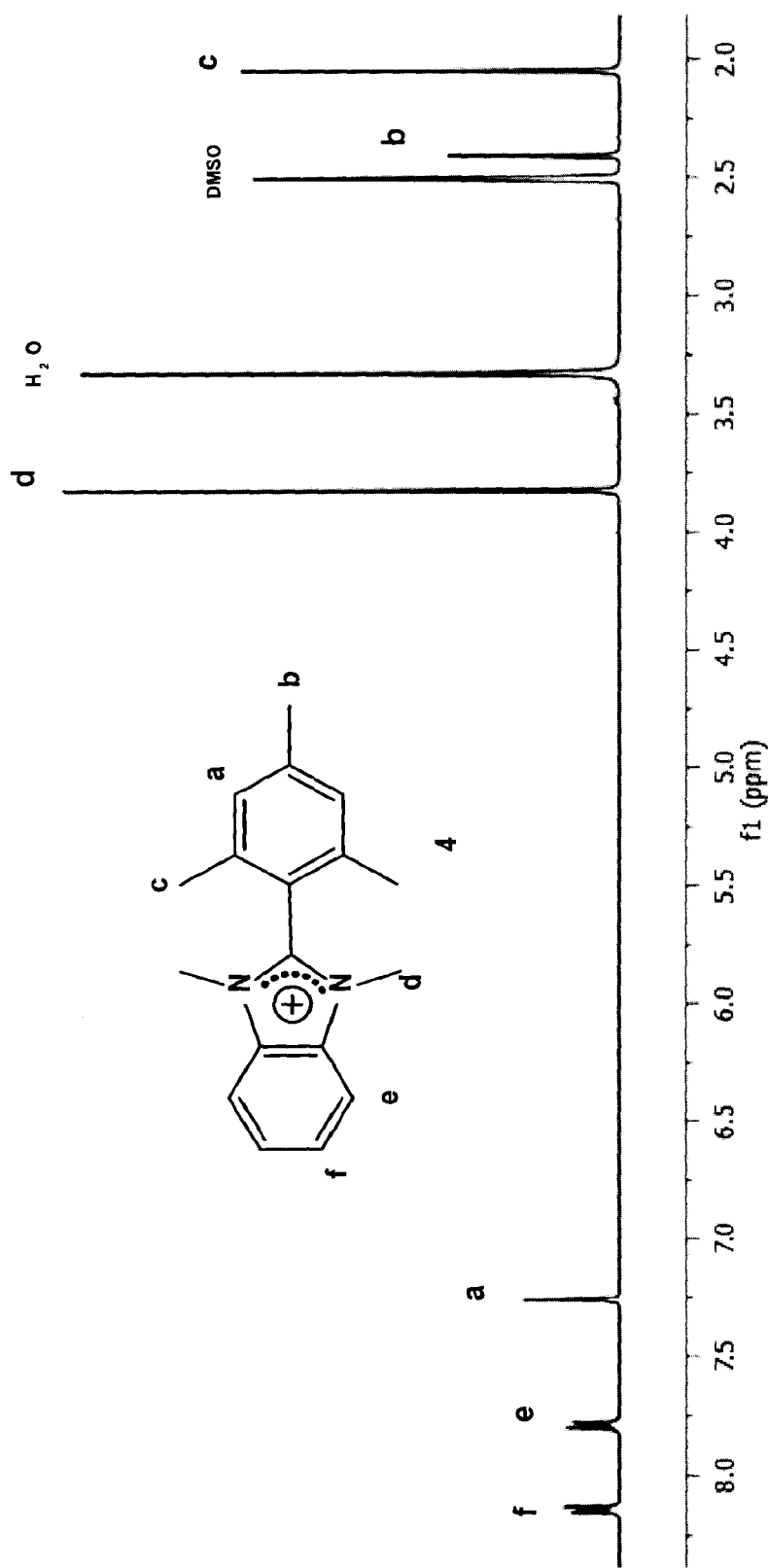
FIG. 16: $^1$H NMR spectrum of 1,3-dimethyl-2-mesitylbenzimidazolium (4) in DMSO-$d_6$.

$^1$H NMR (500 Hz, DMSO-d$_6$, δ, ppm): 8.15 (2H, m, H$_F$), 7.78 (2H, m, H$_E$), 7.26 (2H, s, H$_A$), 3.84 (6H, s, H$_D$), 2.39 (3H, s, H$_B$), 2.05 (6H, s, H$_C$). FTIR (KBr Disk): 2960 (methyl C—H stretch), 1460 (benzimidazole ring deformation), 854 (1, 2, 3, 5 tetra-substituted benzene C—H bend); FIG. 16.

Synthesis of 1,3-dimethyl-2-phenylbenzimidazolium (5)

1,3-Dimethyl-2-phenylbenzimidazolium (5) was synthesized in a similar way to 1,3-dimethyl-2-mesitylbenzimidazolium except using 2-phenyl-benzimidazole instead of 2-mesityl-benzimidazole. Molar amounts used were the same, which produced yellow crystals in 76% yield.

1,3-Dimethyl-2-phenylbenzimidazolium (5)

Figure 17:
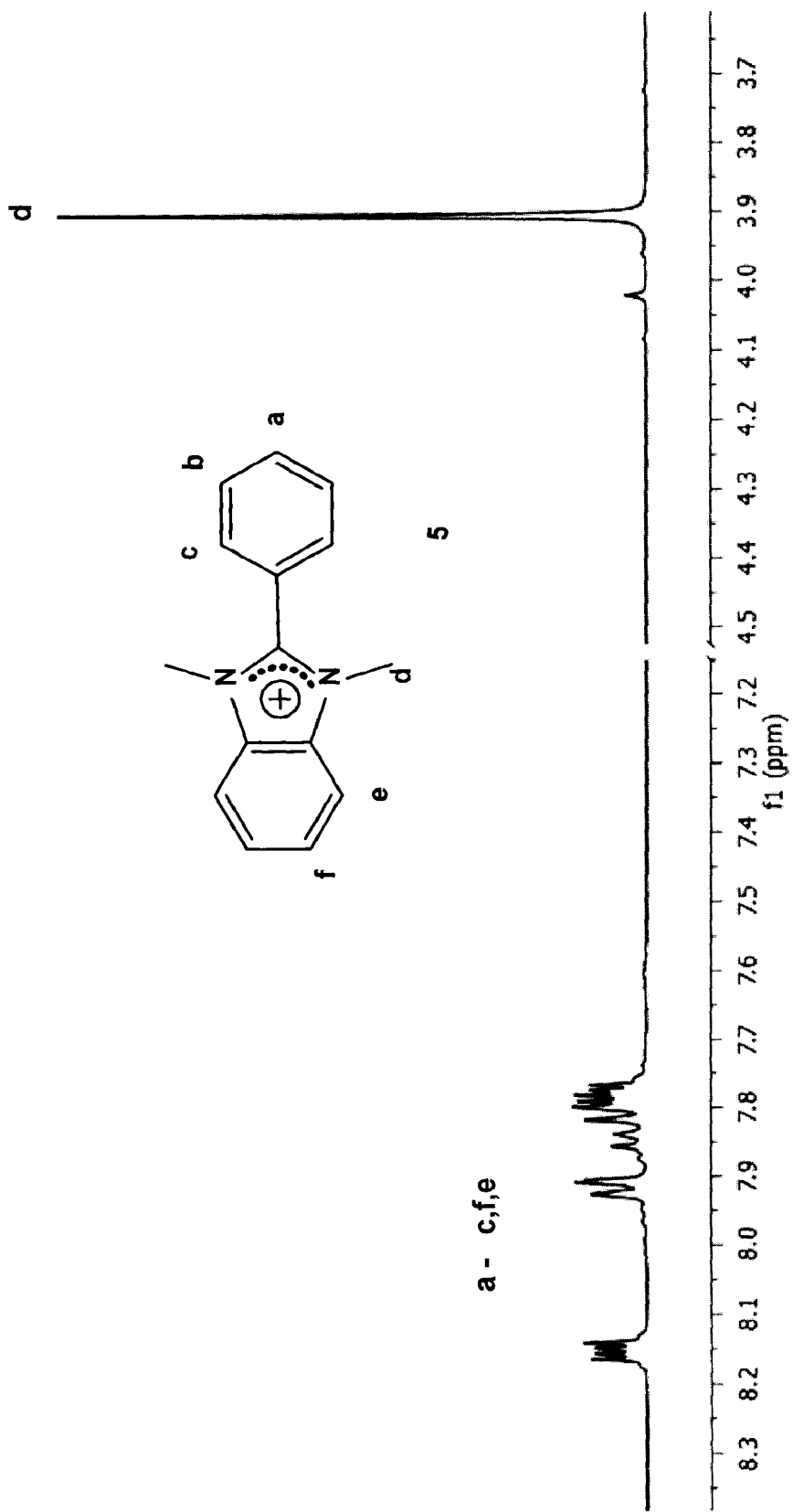
FIG. 17: $^1$H NMR spectrum of 1,3-dimethyl-2-phenylbenzimidazolium (5) in DMSO-$d_6$.

$^1$H NMR (500 Hz, DMSO-d$_6$, δ, ppm): 8.16-7.26 (9H, m, H$_{A-C,F,E}$), 3.90 (6H, s, H$_D$). FTIR (KBr Disk): 3012 (aromatic C—H stretch), 1467 (benzimidazole ring deformation), 765 and 693 (monosubstituted benzene ring); FIG. 17.

Synthesis of N-methyl-N-(2-methylamino-phenyl)-benzamide, Decomposition Product of 1,3-dimethyl-2-phenylbenzimidazolium (5) in Hydroxide Solution N-methyl-N-(2-methylamino-phenyl)-benzamide was synthesized by dissolving 0.500 mg of 1,3-dimethyl-2-phenylbenzimidazolium (5) in 20 mL of 2M KOH in methanol. The mixture was refluxed overnight and the methanol was then removed under vacuum. The remaining solid was dissolved in water and extracted with ether. The ether layer was dried with $MgSO_4$ and the solvent was removed under vacuum resulting in a white solid, 76% yield.

Figure 18:
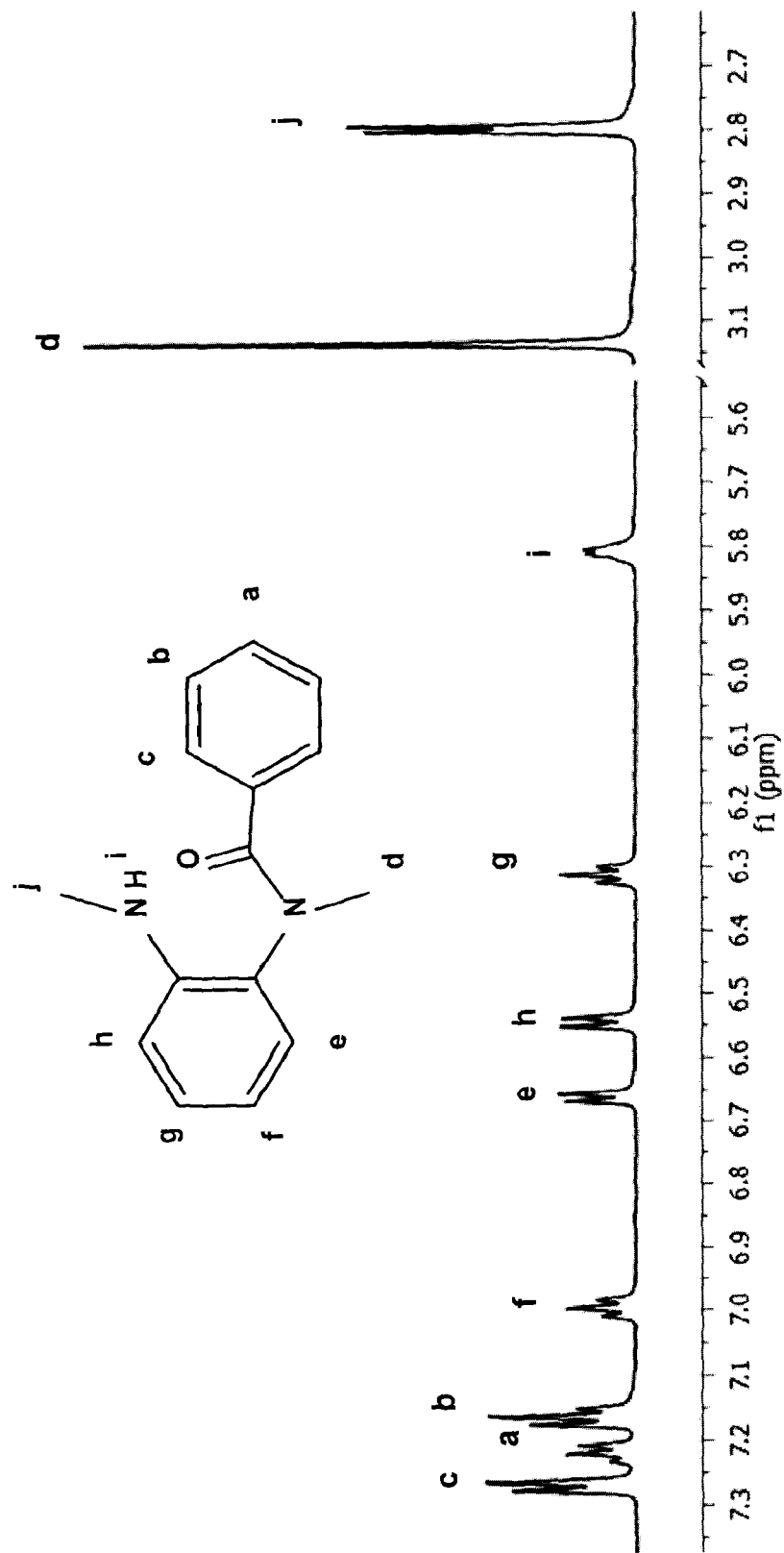
FIG. 18: $^1$H NMR spectrum of N-methyl-N-(2-methylamino-phenyl)-benzamide in DMSO-$d_6$.

N-methyl-N-(2-methylamino-phenyl)-benzamide $^1$H NMR (500 Hz, DMSO-$d_6$, δ, ppm): 7.26 (2H, d, 7 Hz, $H_C$), 7.22 (1H, t, 7 Hz, $H_A$), 7.16 (2H, t, 7 Hz, $H_B$), 6.99 (1H, t, 7 Hz, $H_F$), 6.66 (1H, d, 7 Hz, $H_E$), 6.54 (1H, d, 7 Hz, $H_H$), 6.30 (1H, t, 7 Hz, $H_G$), 5.83 (1H, q, 4 Hz, $H_I$) 3.29 (3H, s, $H_D$), 3.13 (3H, s, $H_J$). FTIR (KBr Disk): 3013 (aromatic C—H stretch), 1633 (tertiary amide C=O); FIG. 18.

Figure 19:
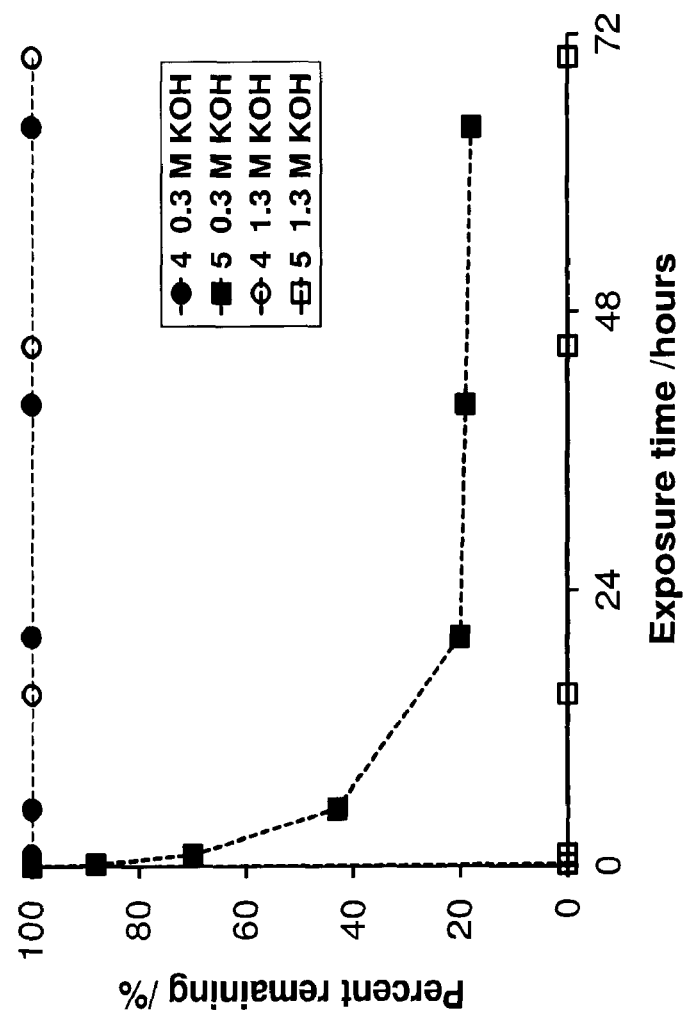
FIG. 19: Percent of 1,3-dimethyl-2-mesitylbenzimidazolium (4) and 1,3-dimethyl-2-phenylbenzimidazolium (5) remaining during exposure to 0.3 and 1.3M KOH at room temperature.

1,3-dimethyl-2-arylbenzimidazolium Stability Measurement in KOH Solution by $^1$H NMR Spectroscopy Solutions of 20 mg of 1,3-dimethyl-2-mesitylbenzimidazolium (4) or 1,3-dimethyl-2-phenylbenzimidazolium (5) were each prepared using 1.000 mL of 1:1 methanol-$d_4$ and DMSO-$d_6$. To these solutions, 0.500 mL of 4M KOH solution (also in $d_4$-methanol) was added. The resulting OFF concentration was 1.3M. Similar measurements were conducted using 0.100 mL of $KOH_{(aq)}$, resulting in an overall OFF concentration of 0.3M. After thorough mixing, this solution was deposited into NMR tubes and the samples were analyzed periodically by $^1$H NMR to determine the percentage of benzimidazolium remaining. This amount was determined from the ratio of the integrals of the aromatic peaks of benzimidazolium to those due to the decomposition product. The data are summarized in FIG. 19.

Chemical Stability of Mes-PDMBI Dissolved in KOH Solution

Figure 20:
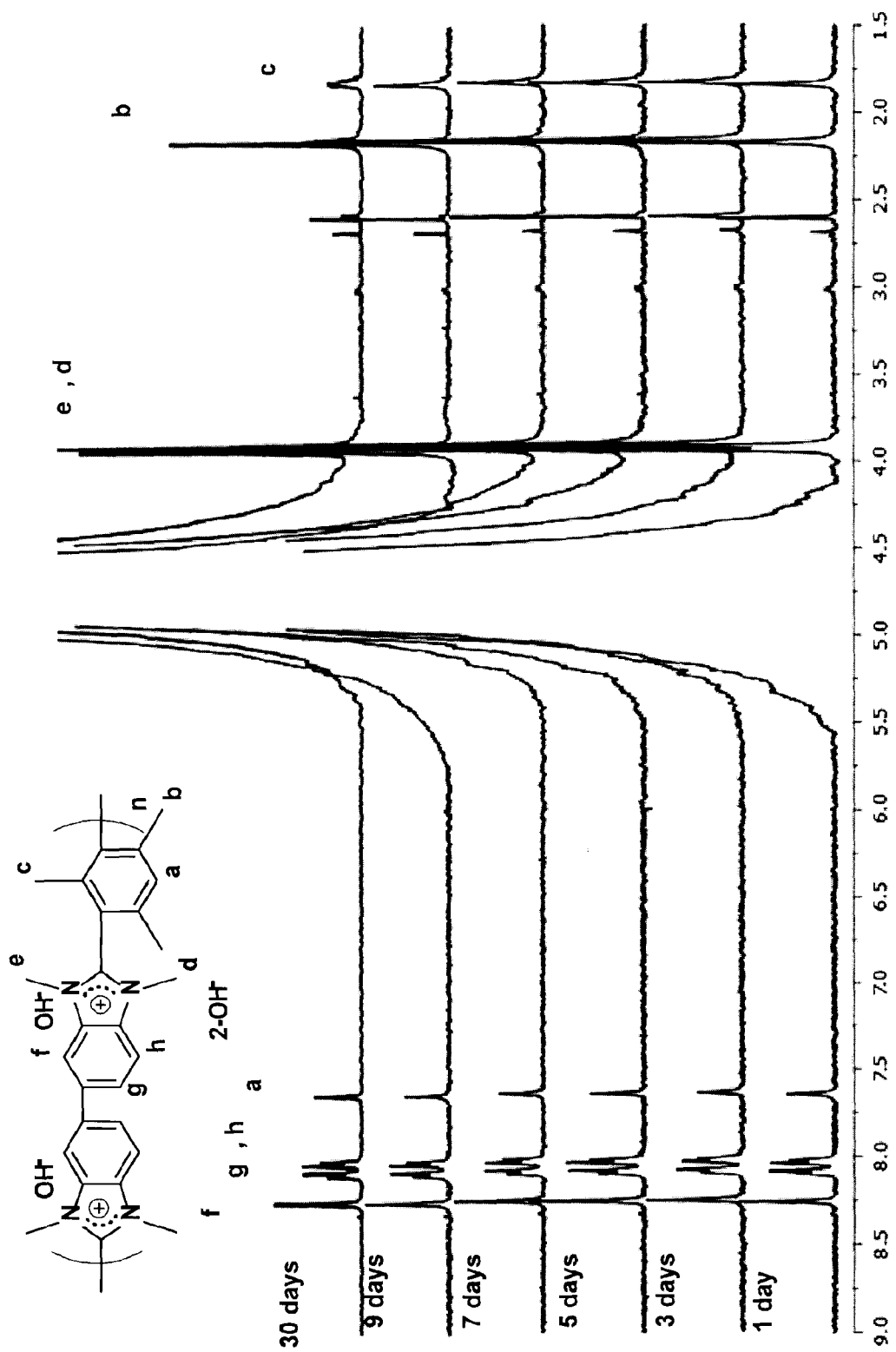
FIG. 20: $^1$H NMR spectra of polymer 2 in the presence of OFF over a period of 30 days.

A solution of 20 mg of Mes-PDMBI in the iodide form (2-I$^-$) was added to a solution of 0.5M KOH in a 1:1 $H_2O:D_2O$ mixture. The polymer dissolved and $^1$H NMR spectra were taken periodically over the course of 30 days. The $^1$H NMR spectra are compiled in FIG. 20 showing little change in the polymer during the course of the experiment.

Calculated Ion Exchange Capacity (IEC) of 2-X$^-$ ($IEC_{2-X^-}$)

The IEC of Mes-PDMBI (2-X$^-$) was calculated from the number of ion pairs per repeat unit of the polymer per molecular weight of that repeat unit (Equation 1). Note: The molecular weight of the repeat unit and thus IEC of these materials is dependent on the anion present.

$$IEC_{2-X^-} = \left(\frac{\text{Number of Ionic Pairs per repeat Unit}}{\text{Molecular Weight of repeat unit}}\right) \quad (1)$$

Preparation of Blend Membranes (1):(2-I$^-$)

The blend membranes were produced by mixing 4.5 and 8.2% solutions of 1 and 2-I$^-$ in DMSO to produce blends of the appropriate IEC. Membranes were cast in flat bottom Petri dishes, heated at 80° C. overnight and then under vacuum at 50° C. for 2 h. A similar procedure was used for non-blended films of 2-I$^-$, which were cast from a 3 wt % solution in DMSO.

Conversion of Membranes to the Hydroxide Form

Membranes in the F form were exposed to 0.1M KOH solutions for 24 h to convert them to the hydroxide form. The films were then soaked in deionized water for 24 h, refreshing the water periodically to remove any residual salts.

Due to the high IEC of some of the membranes, conversion to the OFF form resulted in their dissolution. In these cases, dialysis was used to remove potassium salts and membranes were then recast from aqueous solution.

Calculated Ion Exchange Capacity of Blend Membranes in OH-Form ($IEC_{Blend-Calc}$)

The IECs of the blend polymers are the difference of the acidic contribution of 1 subtracted from the basic contribution of 2-OH$^-$. The acidic IEC is calculated by dividing the number of NH sites per repeat unit by the molecular mass of the repeat unit in polymer 1 (Equation 2).

$$IEC_{Acidic} = \left(\frac{\text{Number of NH sites per repeat unit}}{\text{Molecular weight of acidic repeat unit}}\right) \quad (2)$$

The basic IEC is determined by dividing the number of OH$^-$ per repeat unit by the molecular weight of the repeat unit in 2-OH$^-$ (Equation 3).

$$IEC_{Basic} = \left(\frac{\text{Number of OH}^- \text{ sites per repeat unit}}{\text{Molecular weight of repeat unit}}\right) \quad (3)$$

The IEC of the blends are dependent on the relative amounts of acidic and basic polymer present. Taking this into account, the IEC of the blends can be determined using Equation 4.

$$IEC_{Blend:OH^-} = (x)IEC_{Basic} - (1-x)IEC_{Acidic} \quad (4)$$

Where "x" represents the percentage of 2-OH$^-$ by mass in the final membrane.

Experimental Ion Exchange Capacity of Blend Membranes in OH$^-$ Form ($IEC_{Blend-Titr}$)

Ion exchange capacity was measured for these materials using back titrations. The membranes, initially in the hydroxide form were soaked $NaCl_{(aq)}$ solution. A known amount of standardized $HCl_{(aq)}$ solution was then added and the system was allowed to soak for 2 h. Titrations were performed on this solution using standardized $NaOH_{(aq)}$ solution until the endpoint (indicated by phenolphthalein) was reached.

Hydroxide groups present in the sample was calculated by subtracting the moles of NaOH added from the moles of HCl added. IEC was then calculated by dividing the moles of hydroxide in the polymer sample by its dry mass.

Water Uptake

Membranes were dried under vacuum for 20 h at 80° C. and weighed to obtain the dry weight of the film. The film was then soaked in deionized water for 24 h and weighed again to obtain the hydrated membrane mass. Water uptake was calculated in percent using Equation 5.

$$\text{Water Uptake} = \left(\frac{\text{mass of hydrated membrane} - \text{mass of dry membrane}}{\text{mass of dry membrane}}\right) \times 100\% \quad (5)$$

Lambda (λ)

Lambda values (i.e., the number of water molecules per mobile anion) were calculated using the following Equation 6:

$$\lambda = 10\frac{\text{Water Uptake}}{(MW_{water})(IEC)} \quad (6)$$

Where $MW_{water}$ is the molecular weight of water, the multiplier 10 takes into account that water uptake is reported as a percentage and IEC is reported as meq/g.

Anionic Conductivity ($\sigma_{x-}$)

Anionic conductivity was measured by AC impedance spectroscopy with a Solartron 1260 frequency response analyzer (FRA) employing a transverse two-electrode configuration. Membrane samples were soaked in DI H$_2$O overnight, cut to required dimensions (0.5 cm×1.0 cm), and laid across two Pt electrodes (1 cm×1.5 cm) 0.5 cm apart, fixed on a PTFE block. A second PTFE block was placed on top and two clamps were used to hold the assembly together during measurement. Both PTFE blocks were vented with rectangular cut-aways to allow for membrane hydration. Membranes were kept hydrated by periodically wetting them with DI H$_2$O.

Ionic resistance was extracted from impedance data and fitting was performed by non-linear least squares regression analysis to a standard Randles equivalent circuit model. The ionic resistance was used to calculate anionic conductivity, according to Equation 7.

$$\sigma_{x^-} = \frac{L}{R_m A} \quad (7)$$

where L is the spacing between the Pt electrodes (0.5 cm), A is the cross sectional area of the membrane (w×h), and $R_m$ is the ionic resistance of the membrane.

Molecular Modeling

Geometry optimisations were performed with Gaussian 09 (Revision A.02) software, using B3LYP and the 6-31 g* basis set on all atoms.

While illustrative embodiments have been illustrated and described, it will be appreciated that various changes can be made therein without departing from the spirit and scope of the invention.

Anion-Conducting Moiety Incorporated into Polymer Pendant Groups Via Imine Nitrogen In this exemplary embodiment, the disclosed moieties are attached to commercial polymers containing chloromethyl groups through the imine nitrogen. This results in the formation of an imidazolium or benzimidazolium group that, because it was derived from a sterically crowded imidazole or benzimidazole, has a high degree of alkali stability. This process allows for the conversion of a large range of commercial polymers into alkali-stable anion exchange materials.

Exemplary Syntheses

The exemplary syntheses are shown for the fabrication of benzimidazolium functionalized systems. Similar syntheses are used to fabricate imidazolium functionalized systems.

Synthesis of Crowded Benzimidazole, 2-mesitylbenzimidazole

2-Mesitylbenzimidazole was synthesized by dissolving 1.5 g 1,2-phenylene diamine (14 mmol) in 40 g of PPA at 120° C. To this solution, 2.1 g of 2,4,6-trimethylbenzoic acid (13 mmol) was added and the temperature was increased to 150° C. After 16 h the solution was cooled to 60° C. and poured into water, forming an off-white precipitate. The precipitate was separated by filtration and washed thoroughly with water, yielding 2.6 g of light brown powder (85% yield).

2-Mesitylbenzimidazole $^1$H NMR (500 Hz, DMSO-d$_6$, δ, ppm): 12.46 (1H, s, H$_D$), 7.66 (1H, dd, 7 Hz, 2 Hz, H$_E$), 7.49 (1H, dd, 7 Hz, 2 Hz, H$_H$), 7.20 (2H, pent. d, 7 Hz, 2 Hz, H$_{F,G}$), 7.01 (2H, s, H$_A$), 2.32 (3H, s, H$_B$), 2.07 (6H, s, H$_C$). FTIR (KBr Disk, cm$^{-1}$): 3200-2300 (N—H stretch), 1614.

Figure 21:
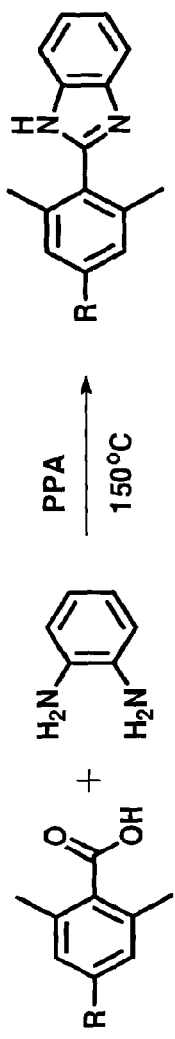
FIG. 21: Reaction scheme for the synthesis of an intermediate of the disclosed anion-conducting moieties.

2-(2,6-dimethyl)-benzimidazole was made in a similar fashion using 2,6-dimethylbenzoic acid instead of 2,4,6-trimethylbenzoic acid in similar molar ratios. The general reaction scheme is illustrated in FIG. 21.

Synthesis of Crowded N-Methylbenzimidazole, 2-mesityl-1-methylbenzimidazole

Figure 22:
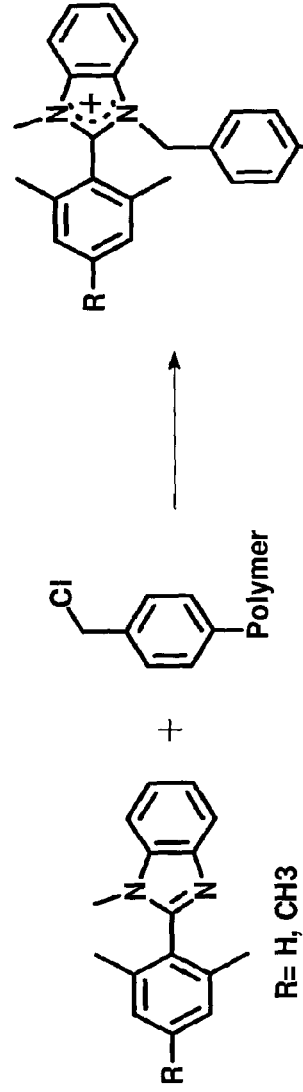
FIG. 22: Reaction scheme for the synthesis of an intermediate of the disclosed anion-conducting moieties, continuing the scheme of FIG. 21.

2-Mesityl-1-methylbenzimidazole was synthesized by dissolving 2 g (8.4 mmol) of 2-mesitylbenzimidazole in methanol (10 mL) with 1.0 g NaOH and 1.4 g of iodomethane (10 mmol). This mixture was put in a magnetic stirrer equipped pressure tube and stirred for 16 h at 110° C. 2-(2,6-dimethyl)-1-methylbenzimidazole was made in a similar fashion using 2-(2,6-dimethyl)-benzimidazole instead of 2-mesitylbenzimidazole in similar molar ratios. The general reaction scheme is illustrated in FIG. 22.

Synthesis of Polymer Containing Crowded Benzimidazolium Side Groups 1.0 g of commercially available poly(chloromethylstyrene) was dissolved in 10 mL dry NMP. To this solution 2.0 g of 2-mesityl-1-methylbenzimidazole (8 mmol, 1.2 times excess). The solution was heated to 80° C. for 24 hours. The reaction mixture was cooled to room temperature and poured into acetone to precipitate the benzimidazolium substituted polymer, which was separated by filtration.

Poly((2-Mesityl-1-methylbenzimidazole)-methylstyrene)

Figure 23:
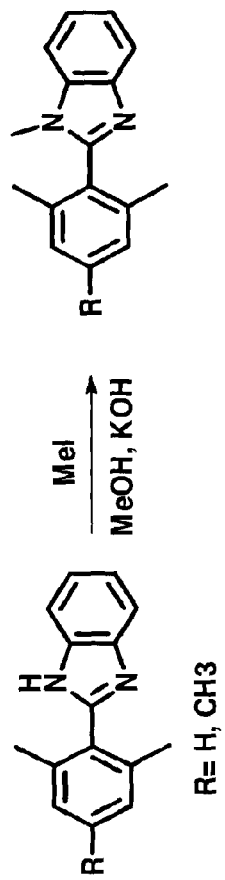
FIG. 23: Reaction scheme for the synthesis of a polymer incorporating the disclosed anion-conducting moieties, continuing the scheme of FIG. 22.
Figure 24:
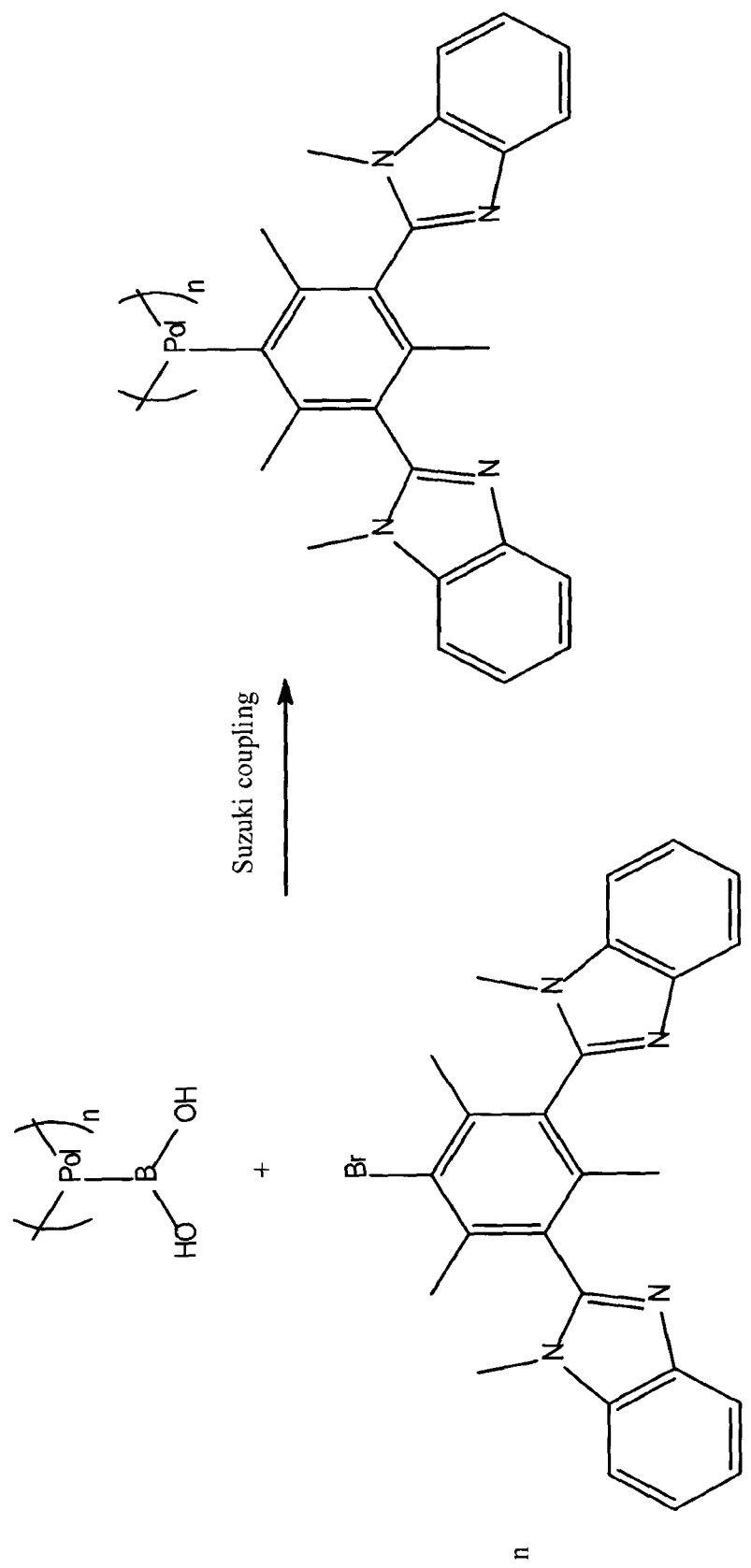
FIG. 24: Reaction scheme for the synthesis of a polymer incorporating the disclosed anion-conducting moieties.
Figure 25A:
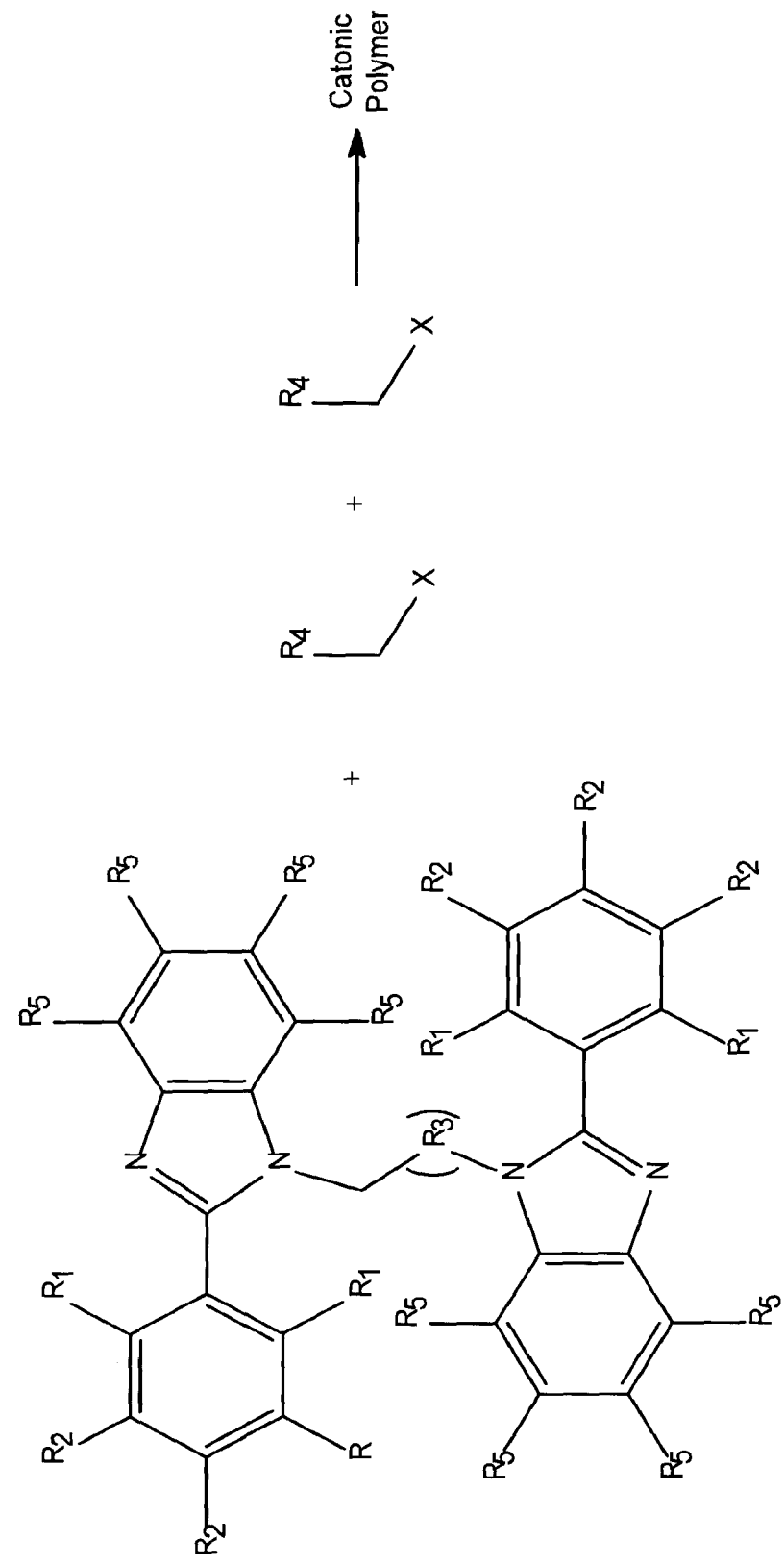
FIGS. 25A-25H: Reaction schemes for the synthesis of crosslinked polymers incorporating the disclosed anion-conducting moieties.
Figure 25B:
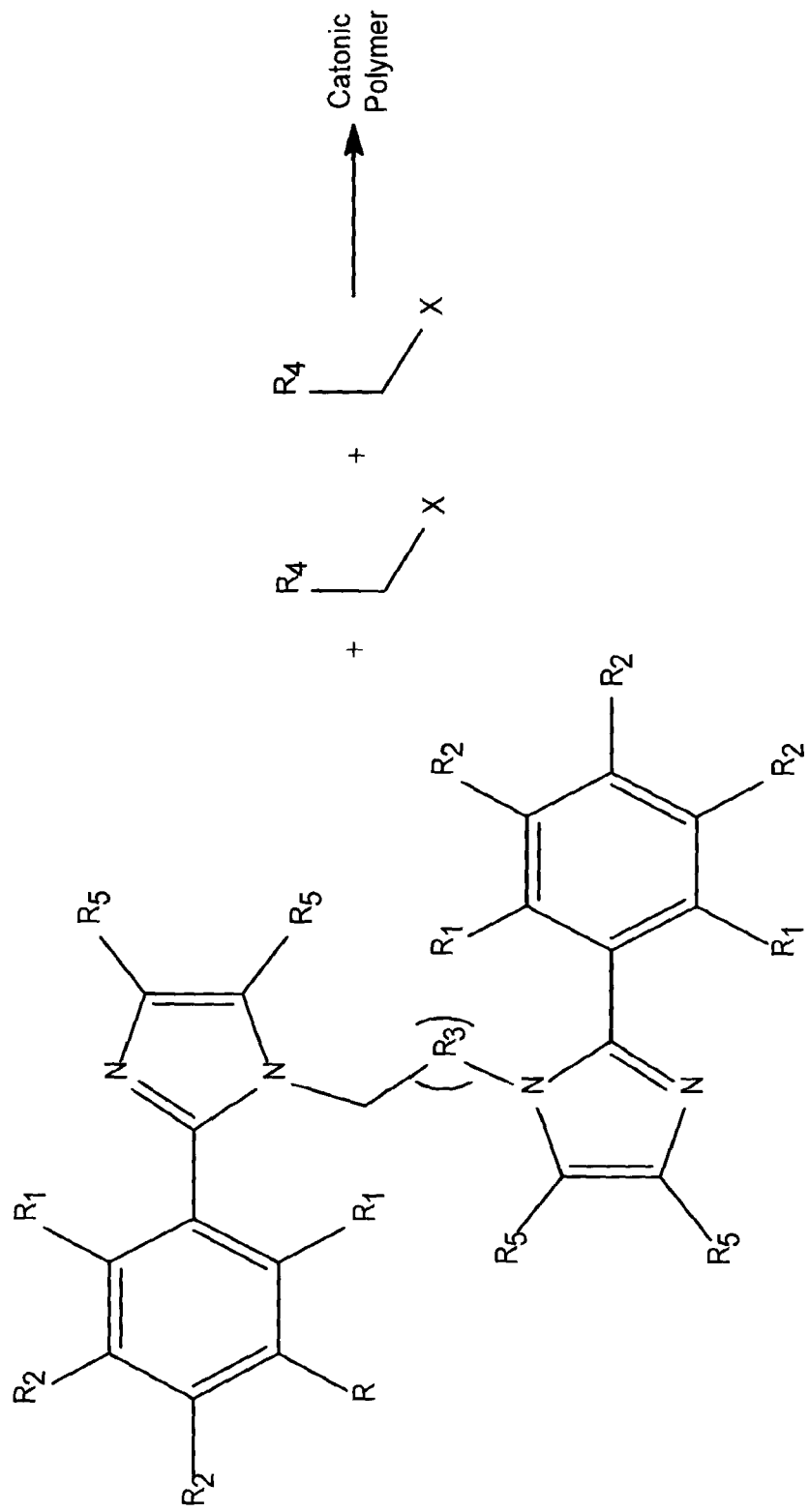
Figure 25C:
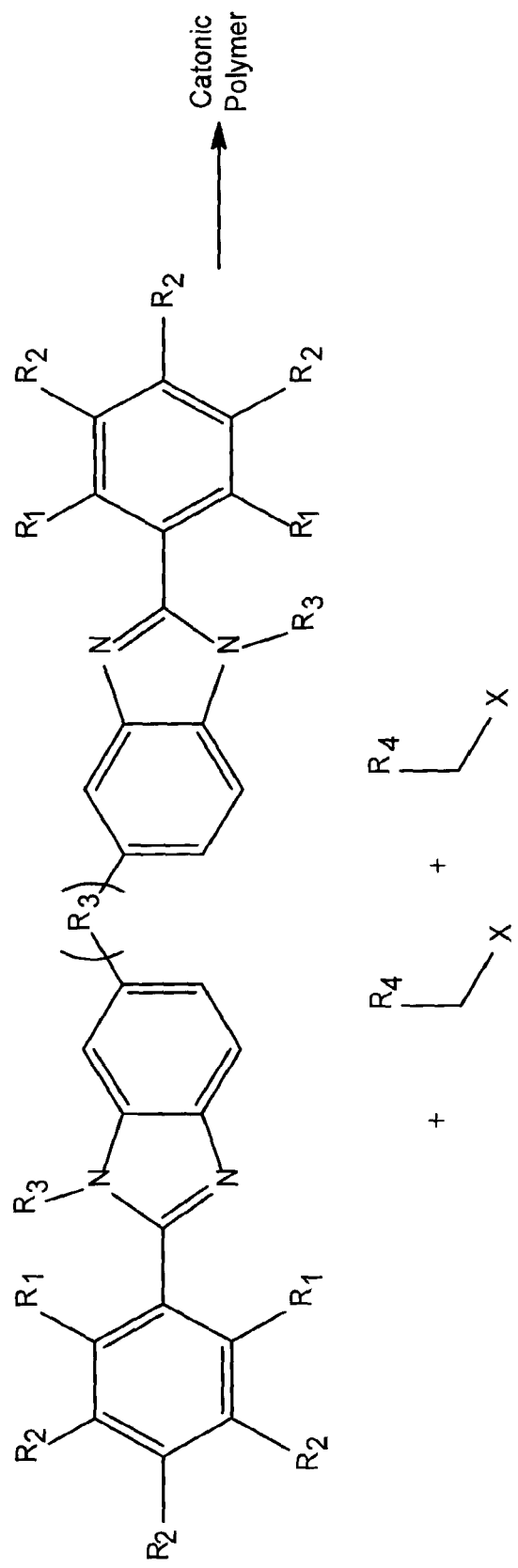
Figure 25D:
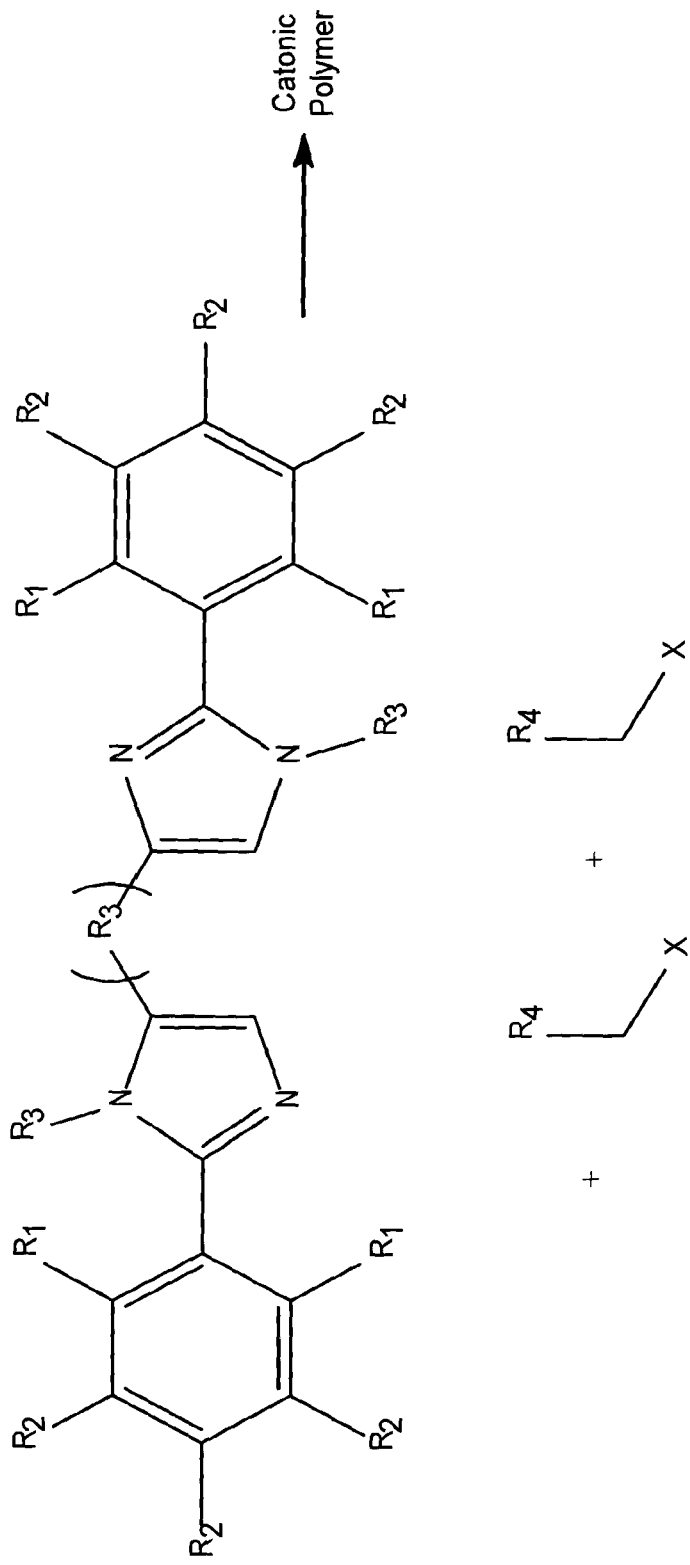
Figure 25E:
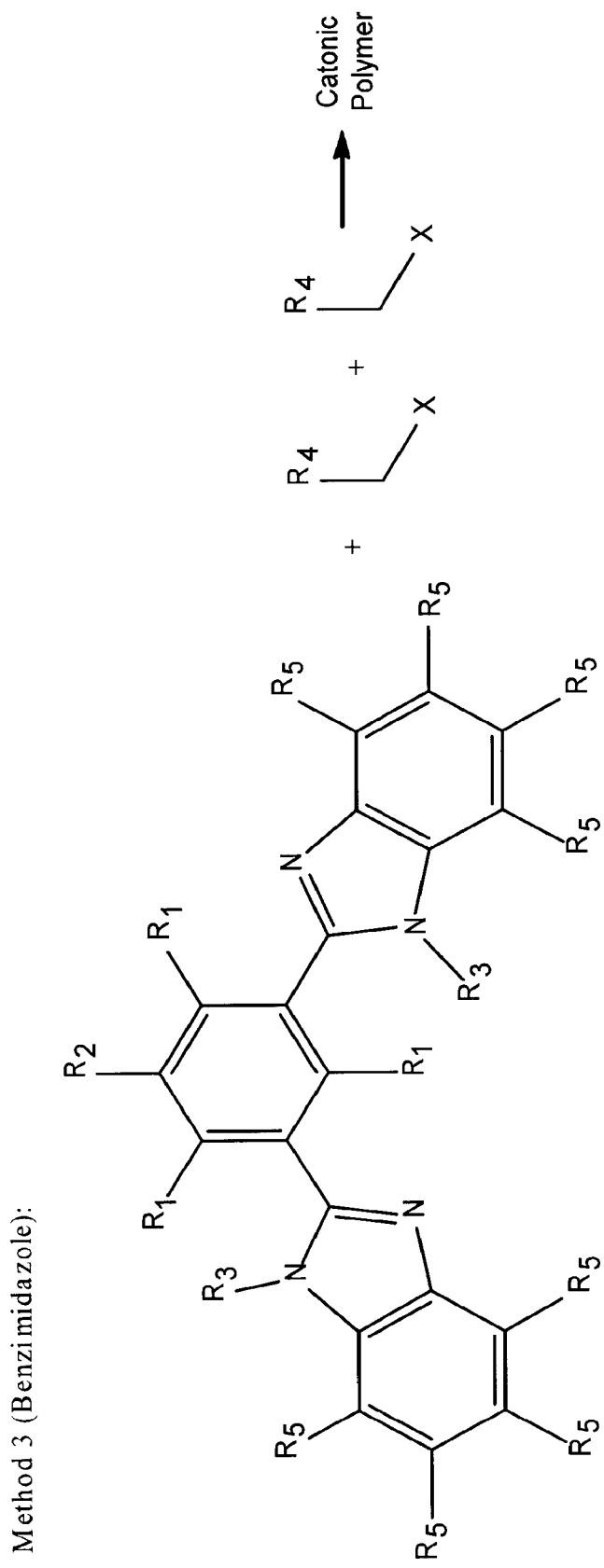
Figure 25F:
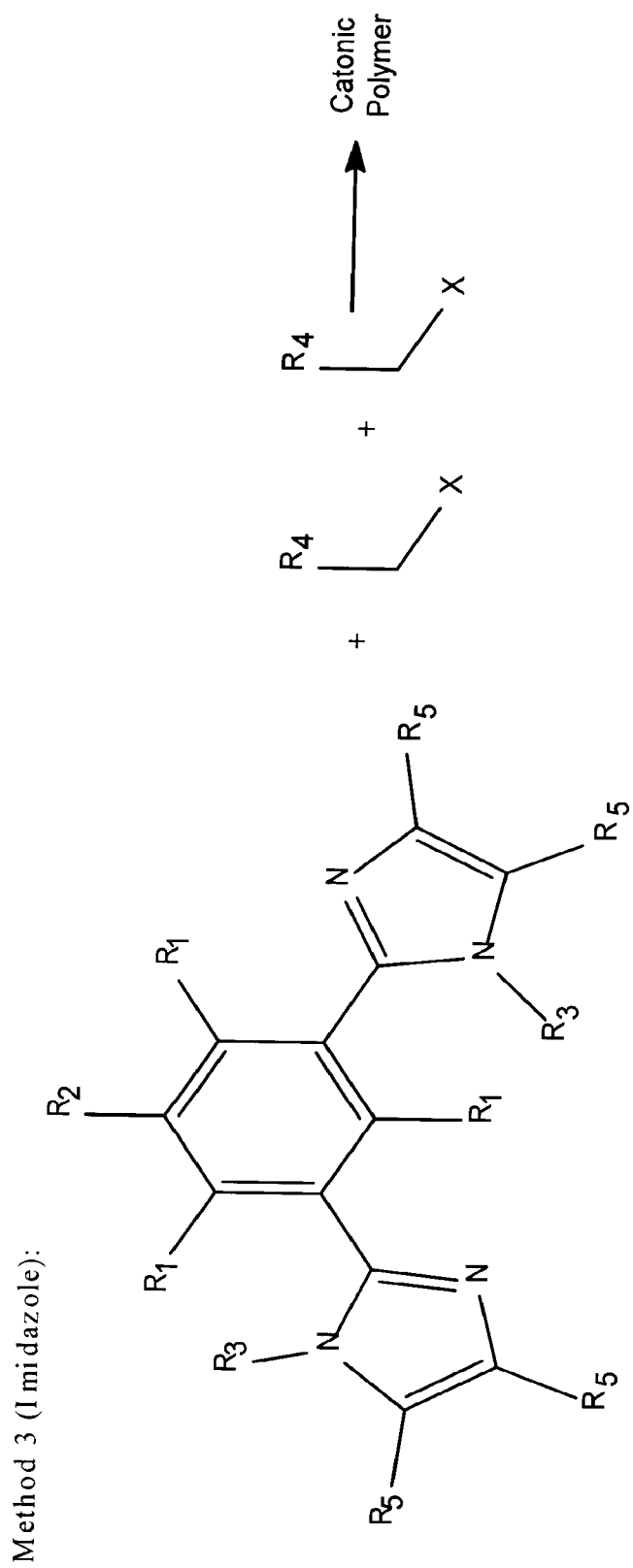
Figure 25G:
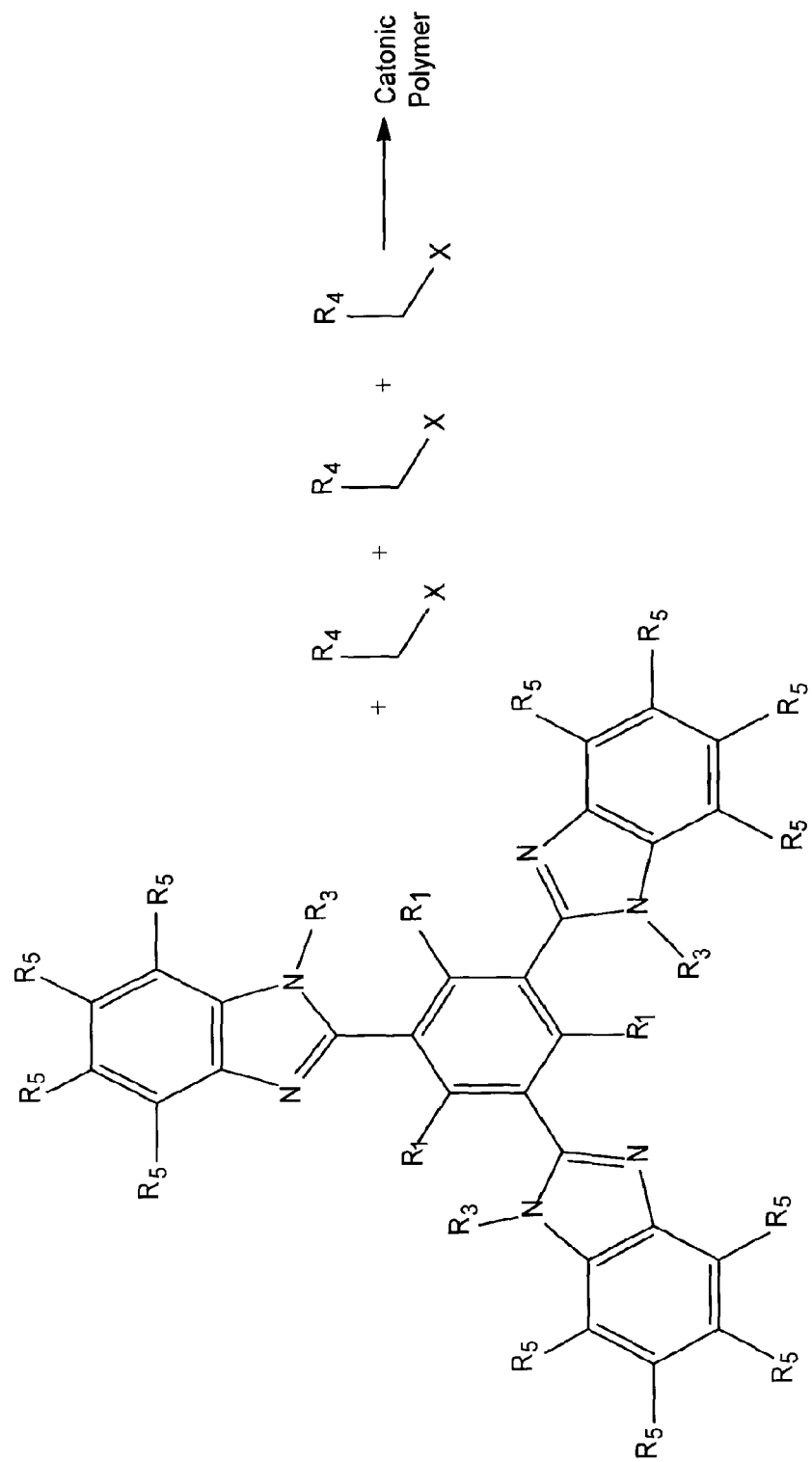
Figure 25H:
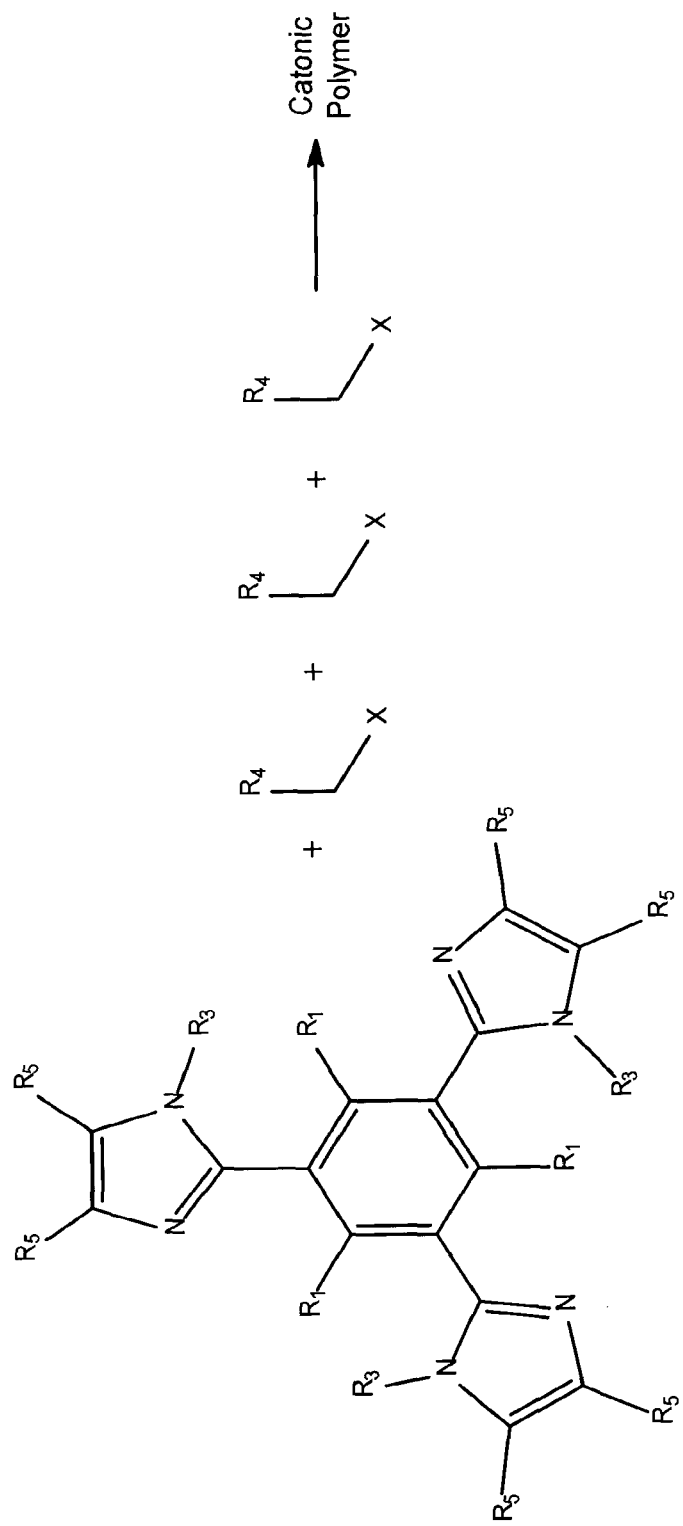

A range of polymer backbones containing halomethyl groups can be used in similar syntheses to yield different alkali stable anion exchange materials. The general reaction scheme is illustrated in FIG. 23.

While the linker group between the polymer and the moieties in this embodiment is methylstyrene, it will be appreciated that any group capable of bonding to both the polymer main chain and the moieties can be used.

Anion-Conducting Moiety Incorporated into Polymer Pendant Groups Via Aryl Group

The anion-conducting moieties M1 and M2 can also be incorporated into a polymer by linking through the aryl group providing the steric crowding and/or the benzimidazolium aryl ring.

While any methods known to those of skill in the art for attaching the moieties to a polymer are useful in the provided embodiments, the following reaction, illustrated in FIG. 25, uses Suzuki coupling. The reaction is then followed by functionalization of the imine nitrogens (e.g., methylation with methyl iodide) to form the cationic anion-conducting moiety attached to the polymer. Once again, the polymer can be any polymer supporting the chemical groups necessary to link the moieties (e.g., the Suzuki coupling group in FIG. 25).

Anion-Conducting Moiety Incorporated into Crosslinked Polymer

The anion-conducting moieties M1 and M2 can also be incorporated as a crosslinker between two polymer chains, or with a crosslinker inbetween two moieties. Given the variety of possible locations for attaching the moiety to a polymer chain as a pendant group, those same attachment locations are available for attachment to a second polymer chain.

FIGS. 25A-25H are representative schemes for cross-linking. All of these reactions will result in multiple ammonium functionalities (positively-charged). No further reactions are required. Also, all of these cross-linking reactions use the imidazole nitrogen, thus allowing these reactions to be done by mixing/heating only in a solvent.

In FIGS. 25A-25H, all groups are independently selected according to the following:

$R_1$=methyl, trifluoromethyl, alkyl, perfluoroalkyl, heteroalkyl, alkoxy, perfluoroalkoxy, halo, aryl, heteroaryl group or polymer, where $R_1$ are the same or different;

$R_2$=hydrogen, any group, or a polymer where $R_2$ are the same or different;

$R_3$=methyl, trifluoromethyl, alkyl, perfluoroalkyl, heteroalkyl, aryl, aralkyl, a polymer or no group, where $R_3$ are the same or different;

$R_4$=any group, including any polymer or aryl group;

$R_5$=hydrogen, any group, or a polymer, where $R_5$ are the same or different; and X=Cl, Br or I;

Wherein at least one of $R_1$, $R_2$, $R_3$, $R_4$, and $R_5$, is a polymer.

As an example of using the moiety M1 as a crosslinker, if both $R_4$s are polymer chains, there will be cross-linking between the two polymer chains with a benzimidazolium as the cross-linker (attached at the nitrogens).

The embodiments of the invention in which an exclusive property or privilege is claimed are defined as follows:

1. A polymer comprising one or more repeating units, wherein at least one of the repeating units comprises one or more imidazolium-containing moieties having Formula (II-A):

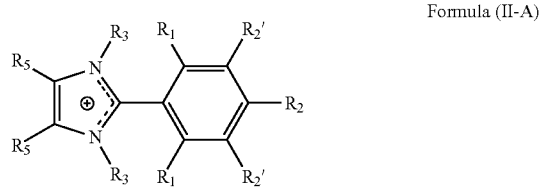

Formula (II-A)

wherein:

$R_1$ is independently selected from the group consisting of alkyl, perfluoroalkyl, heteroalkyl, alkoxy, perfluoroalkoxy, aryl, heteroaryl group and a polymer;

$R_2$ is alkyl;

$R_2'$, at each occurrence, is independently selected from the group consisting of hydrogen and a polymer;

$R_3$ is independently selected from the group consisting of alkyl, perfluoroalkyl, heteroalkyl, aryl, aralkyl, and a polymer; and $R_5$ is independently selected from the group consisting of hydrogen, any group, and a polymer;

wherein at least one of $R_1$, $R_2'$, $R_3$, and $R_5$, is a polymer.

2. The polymer of claim 1, wherein the polymer is a salt formed with an anion selected from the group consisting of iodide, hydroxide, chloride, bromide, fluoride, cyanide, acetate, carbonate, nitrate, sulfate, phosphate, triflate, and tosylate.

3. The polymer of claim 1, wherein the imidazolium-containing moiety is included in a main chain of the polymer.

4. The polymer of claim 1, wherein the imidazolium-containing moiety is included in a pendant group of the polymer.

5. The polymer of claim 1, wherein the imidazolium-containing moiety is part of a crosslink of the polymer.

6. The polymer of claim 1, wherein $R_1$ is independently selected from the group consisting of methyl and trifluoromethyl.

7. The polymer of claim 1, wherein $R_3$ is independently selected from the group consisting of methyl and trifluoromethyl.

8. The polymer of claim 1, wherein $R_2$ is methyl.

9. The polymer of claim 1, wherein $R_5$ is independently selected from the group consisting of aryl and alkyl.

10. An ionic membrane comprising a cationic polymer of claim 1.

11. The ionic membrane of claim 10, further comprising an anionic polymer.

12. The ionic membrane of claim 11, wherein the cationic polymer is ionically bound to the anionic polymer.

13. The ionic membrane of claim 10, further comprising an acidic polymer.

14. The ionic membrane of claim 13, wherein the acidic polymer comprises an imidazole-containing moiety.

15. The ionic membrane of claim 13, wherein the cationic polymer is bound to an anionic polymer created in situ after the deprotonation of the acidic polymer.

* * * * *